US010419917B1

(12) United States Patent
Patton et al.

(10) Patent No.: US 10,419,917 B1
(45) Date of Patent: Sep. 17, 2019

(54) VALIDATING AND SUPPLEMENTING EMERGENCY CALL INFORMATION

(71) Applicant: Banjo, Inc., Park City, UT (US)

(72) Inventors: Damien Patton, Park City, UT (US); Rish Mehta, Redwood City, CA (US); Christian Gratton, Las Vegas, NV (US); Varun Gowda, Salt Lake City, UT (US); Michael B. Dodd, Salt Lake City, UT (US)

(73) Assignee: Banjo, Inc., Park City, UT (US)

( * ) Notice: Subject to any disclaimer, the term of this patent is extended or adjusted under 35 U.S.C. 154(b) by 0 days.

(21) Appl. No.: 16/374,939

(22) Filed: Apr. 4, 2019

Related U.S. Application Data

(62) Division of application No. 16/192,161, filed on Nov. 15, 2018.

(60) Provisional application No. 62/663,265, filed on Apr. 27, 2018, provisional application No. 62/664,001, filed on Apr. 27, 2018, provisional application No. 62/667,337, filed on May 4, 2018, provisional application No. 62/667,343, filed on May 4, 2018, provisional application No. 62/667,616, filed on May 7, 2018, provisional application No. 62/668,821, filed
(Continued)

(51) Int. Cl.
*H04M 11/04* (2006.01)
*H04W 4/90* (2018.01)
*G10L 15/22* (2006.01)
*G10L 15/26* (2006.01)

(52) U.S. Cl.
CPC .............. *H04W 4/90* (2018.02); *G10L 15/22* (2013.01); *G10L 15/265* (2013.01)

(58) Field of Classification Search
CPC ...... G08B 25/016; H04W 4/02; H04W 4/029; H04W 4/90; H04W 76/50
See application file for complete search history.

(56) References Cited

U.S. PATENT DOCUMENTS 7,203,635 B2 4/2007 Oliver et al.
8,914,044 B2 12/2014 Raman et al.
(Continued)

OTHER PUBLICATIONS

U.S. Appl. No. 16/394,620, Non Final Office Action dated Jun. 12, 2019, 25 pages.
(Continued)

*Primary Examiner* — Shantell L Heiber
(74) *Attorney, Agent, or Firm* — Michael B. Dodd; R. Jace Hirschi

(57) ABSTRACT

The present invention extends to methods, systems, and computer program products for validating and supplementing emergency call information. A Public Safety Answering Point receives an emergency (e.g., 911) call from a mobile device. Parts of the emergency call are processed to identify an emergency call location. Characteristics of the emergency call are combined with characteristics of other signals to identify and emergency call event, including the emergency call location. The emergency call event is sent to the Public Safety Answering Point. Prior to receiving phase II data and possibly even prior to receiving phase I data, the Public Safety Answering Point receives the event. The Public Safety Answering Point tailors dispatch of emergency resources responding to the emergency call based on characteristics of the event, including the originating location.

20 Claims, 16 Drawing Sheets

Related U.S. Application Data on May 9, 2018, provisional application No. 62/670,641, filed on May 11, 2018, provisional application No. 62/675,740, filed on May 23, 2018, provisional application No. 62/676,269, filed on May 24, 2018, provisional application No. 62/676,271, filed on May 24, 2018, provisional application No. 62/685,814, filed on Jun. 15, 2018, provisional application No. 62/686,791, filed on Jun. 19, 2018, provisional application No. 62/691,806, filed on Jun. 29, 2018.

(56) References Cited

U.S. PATENT DOCUMENTS

| | | |
|---|---|---|
| 9,134,398 B2 | 9/2015 | Dupray et al. |
| 9,372,922 B2 | 6/2016 | Shaashua et al. |
| 9,703,841 B1 | 7/2017 | Hwang et al. |
| 10,268,642 B1 | 4/2019 | Leung |
| 2001/0022558 A1 | 9/2001 | Karr, Jr. et al. |
| 2006/0235833 A1 | 10/2006 | Smith et al. |
| 2012/0136865 A1 | 5/2012 | Blom et al. |
| 2012/0259842 A1 | 10/2012 | Oman et al. |
| 2014/0067951 A1 | 3/2014 | Sheinfeld |
| 2014/0095425 A1 | 4/2014 | Sipple |
| 2014/0244742 A1 | 8/2014 | Yu et al. |
| 2014/0295885 A1* | 10/2014 | Marko ............ H04W 4/02 455/456.1 |
| 2014/0304262 A1 | 10/2014 | Makki |
| 2015/0220835 A1 | 8/2015 | Wilson et al. |
| 2015/0234570 A1 | 8/2015 | Hampson |
| 2017/0142200 A1 | 5/2017 | Kodner et al. |
| 2018/0097762 A1 | 4/2018 | Garcia |
| 2018/0151174 A1* | 5/2018 | Lee ............ G10L 15/26 |
| 2018/0199179 A1* | 7/2018 | Rauner ............ H04W 4/90 |
| 2018/0225687 A1 | 8/2018 | Ahmed |
| 2018/0276351 A1 | 9/2018 | Patton et al. |
| 2019/0068784 A1* | 2/2019 | Reddy ............ H04M 3/5116 |
| 2019/0082044 A1 | 3/2019 | Melendez |

OTHER PUBLICATIONS

U.S. Appl. No. 16/396,454, Non Final Office Action dated Jun. 28, 2019, 14 pages.

\* cited by examiner

VALIDATING AND SUPPLEMENTING EMERGENCY CALL INFORMATION

CROSS-REFERENCE TO RELATED APPLICATIONS

This application is a divisional of U.S. patent application Ser. No. 16/192,161, entitled "Validating And Supplementing Emergency Call Information", filed Nov. 15, 2018, which is incorporated herein in its entirety.

This application claims the benefit of U.S. Provisional Patent Application Ser. No. 62/664,001, entitled "Normalizing Different Types Of Ingested Signals Into A Common Format", filed Apr. 27, 2018, which is incorporated herein in its entirety. This application claims the benefit of U.S. Provisional Patent Application Ser. No. 62/663,265, entitled "Supplementing/Validating 911 Call Information With Location And Severity Data, filed Apr. 27, 2018, which is incorporated herein in its entirety. This application claims the benefit of U.S. Provisional Patent Application Ser. No. 62/668,821, entitled "Supplementing/Validating 911 Call Information With Location And Severity Data, filed May 9, 2018, which is incorporated herein in its entirety. This application claims the benefit of U.S. Provisional Patent Application Ser. No. 62/667,337, entitled "On Demand Signal Acquisition Trigger From Evidence Of Live Events", filed May 4, 2018, which is incorporated herein in its entirety. This application claims the benefit of U.S. Provisional Patent Application Ser. No. 62/667,343, entitled "Using Prior Events As Signals During Signal Ingestion", filed May 4, 2018, which is incorporated herein in its entirety. This application claims the benefit of U.S. Provisional Patent Application Ser. No. 62/667,616, entitled, "Normalizing Different Types Of Ingested Signals Into A Common Format", filed May 7, 2018, which is incorporated herein in its entirety. This application claims the benefit of U.S. Provisional Patent Application Ser. No. 62/670,641, entitled "Determining And Supplementing 911 Call Location", filed May 11, 2018, which is incorporated herein in its entirety. This application claims the benefit of U.S. Provisional Patent Application Ser. No. 62/675,740, entitled "Mixing 911 Call Location With Other Signals To Authenticate, Assign Severity, And Provide Situational Awareness", filed May 23, 2018, which is incorporated herein in its entirety. This application claims the benefit of U.S. Provisional Patent Application Ser. No. 62/676,269, entitled "Mixing 911 Call Location Contained In An Audio Overlay With Other Signals To Authenticate, Assign Severity, And Provide Situational Awareness", filed May 24, 2018, which is incorporated herein in its entirety. This application claims the benefit of U.S. Provisional Patent Application Ser. No. 62/676,271, entitled "Overlaying Audio Of Phone Location In An Audio Channel Of A Call", filed May 24, 2018, which is incorporated by reference in its entirety. This application claims the benefit of U.S. Provisional Patent Application Ser. No. 62/685,814, entitled "Ingesting Streaming Signals", filed Jun. 15, 2018, which is incorporated herein in its entirety. This application claims the benefit of U.S. Provisional Patent Application Ser. No. 62/686,791, entitled, "Normalizing Signals", filed Jun. 19, 2018, which is incorporated herein in its entirety. This application claims the benefit of U.S. Provisional Patent Application Ser. No. 62/691,806, entitled "Ingesting Streaming Signals", filed Jun. 29, 2018, which is incorporated herein in its entirety.

BACKGROUND

1. Background and Relevant Art

First responders desire to be made aware of relevant events and related information as close as possible to the events' occurrence (i.e., as close as possible to "moment zero"). Relevancy of an event and related information depends in part on characteristics of information provided by a reporting party.

A public-safety answering point (PSAP), sometimes called "public-safety access point", is a call center responsible for answering calls to an emergency telephone number for police, firefighting, and ambulance services. When someone dials the national 911 number, a PSAP picks up the call. Trained telephone operators are also usually responsible for dispatching these emergency services. Most PSAPs are capable of determining caller location for landline calls. Many PSAPs can also handle cellular carrier data indicating mobile phone location. Some PSAPs can also use voice broadcasting where outgoing voice mail can be sent to many phone numbers at once, in order to alert people to a local emergency, such as a chemical spill.

In the United States, the county or a large city usually handles this responsibility. As a division of a U.S. state, counties are generally bound to provide this and other emergency services even within the municipalities, unless the municipality chooses to opt out and have its own system, sometimes along with a neighboring jurisdiction. If a city operates its own PSAP, but not its own particular emergency service (for example, city police but county fire), it can relay the call to the PSAP that does handle that type of call. The U.S. requires caller location capability on the part of all phone companies, including mobile ones, but there is no federal law requiring PSAPs to be able to receive such information.

More specifically, when an emergency (e.g., 911) call is initiated from a landline, a call request is sent to a Public Switched Telephone Network (PSTN). The PSTN routes the call to a 9-1-1 switch that sends the call to the designated PSAP for the area. When an emergency (e.g., 911) call is initiated from a mobile phone, a call request is sent to a cell site, routed through a mobile switch center of wireless carrier, and to a PSTN. The PSTN routes the call to a 9-1-1 switch that sends the call to the designated PSAP for the area.

BRIEF SUMMARY

Examples extend to methods, systems, and computer program products for validating and supplementing emergency call information.

A Public Safety Answering Point receives an emergency (e.g., 911) call from a mobile phone via a cellular network. The Public Safety Answering Point receives phase I data corresponding to the emergency call. The Public Safety Answering Point requests phase II data corresponding to the emergency call. Prior to receiving phase II data, the Public Safety Answering Point receives a mobile device generated originating location of the emergency call. The Public Safety Answering Point tailors dispatch of emergency resources responding to the emergency call based at least on the originating location.

Raw signals from a number of sources including, a cellular network and/or the Public Safety Answering Point, are normalized. An event detection infrastructure receives a normalized emergency call signal. The event detection infrastructure detects a call location from the normalized emergency call signal. The event detection infrastructure accesses one or more additional normalized signals at or near the location of the normalized emergency call signal. The event detection infrastructure validates the call location based on characteristics of the one or more additional signals. The event detection infrastructure sends the call location to a Public Safety Answering Point.

In one aspect, the event detection infrastructure detects an event. The event detection infrastructure includes the call location, content, a severity, and a truthfulness in the event. The event detection infrastructure sends the event to the Public Safety Answering Point. The Public Safety Answering Point tailors dispatch of emergency resources responding to the emergency call based on characteristics of the event.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1A:
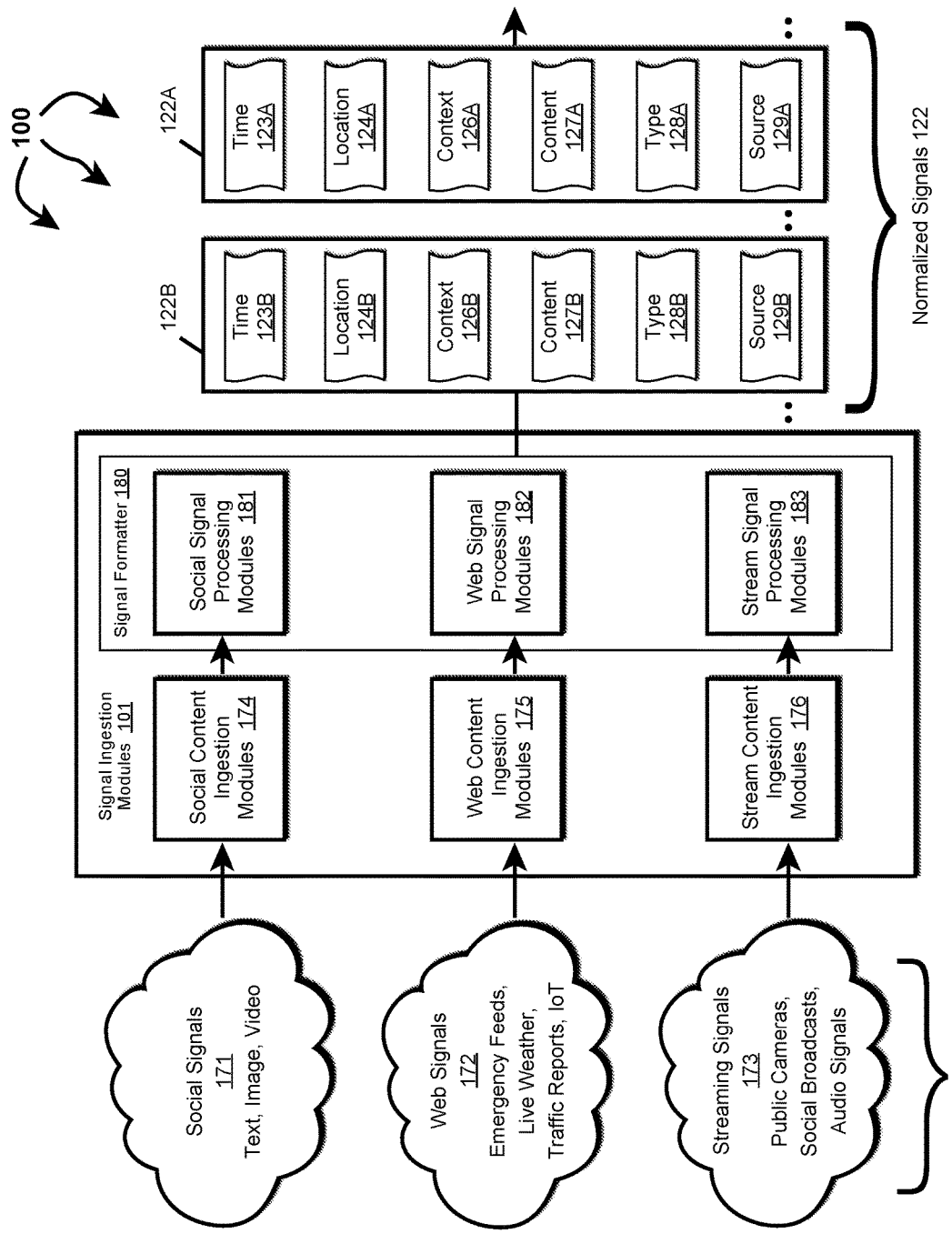
FIG. 1A illustrates an example computer architecture that facilitates normalizing ingesting signals.

Examples extend to methods, systems, and computer program products for validating and supplementing emergency call information.

There is around 6,000 primary and secondary Public Safety Answering Points (PSAPs) in the 3,000 plus counties in the United States. When a call 9-1-1 is initiated from a landline, a call signal goes to the phone company's database. In the database, location information supplied to the phone company (e.g., when service for the landline was established) is located based on the call signal. The call signal along with the located information, in the form of Automatic Name and Location information (ANI/ALI), is sent to a PSAP.

When a 9-1-1 call is initiated from a wireless phone, a call signal first goes to the closet cell tower compatible with the calling phone (which may not be the overall closest cell tower). The call signal is then sent to the PSAP in that cell tower's jurisdiction. At this point, dispatchers can see the location of the cell tower the call is connecting through (i.e., "Phase I" data)

After the call comes in, the PSAP's dispatchers submit a digital request back to the wireless carrier's network asking for the phone's location. If possible, the wireless carrier uses cell tower triangulation to locate the phone (i.e., "Phase II" data). Phase II data can be accurate between 50-300 meters depending on the type of location technology used. However, not all PSAPs have technology to receive Phase II data.

When a call is received at a PSAP, a call taker (telecommunicator) can use a Computer Aided Dispatch (CAD) terminal. Together with a mouse/keyboard telephone interface, information about the caller's location and phone number is available for verification. Even if they have the location, the call taker attempts to verify. This then centers the location on a map.

When a call taker picks up the phone, the call taker can check to see if there are any calls having a location within a specified distance (e.g., 250 meters) of the location of a current call within a specified time period. The call taker assigns a priority based on the reported type of emergency. As the call taker collects call information, call information is forwarded to dispatchers responsible for sending help. Once a call-taker has analyzed a situation, the call is routed by computer to a dispatcher for the appropriate emergency response (Police, Fire, or EMS) to provide the service(s) needed.

The dispatcher allocates the appropriate resources based on location, type of emergency, and resource availability. The call taker can continue to collect information that the dispatcher then relays to the First Responders.

There are hundreds of thousands of 911 calls per day in the United States. In many areas, 80% or more of the 911 calls are from wireless devices.

Most cell towers have three faces or sectors, each covering around 120-degree area extending from the tower. When a mobile device calls 911, one the sectors of a nearby cell tower picks up the call. Equipment maps each sector to a specified PSAP in a database and routes the call to the specified PSAP. When the call reaches the PSAP, the phone number of the call and the location of the cell site or sector (the Phase I data) appears on the call taker's screen. PSAP managers train call takers to know that this address is not accurate and to ask the caller for the location before asking for the nature of the emergency. Statistics have shown that it can take a caller from a few seconds to more than a minute to indicate the call location.

In parallel to a call-taker questioning a caller, a PSAP computer-aided dispatch (CAD) system can request (rebid for) a more accurate location. A location request can be sent manually by an operator or automatically by the CAD system. The request (rebid) process goes back to the cellular network to request more accurate location (the Phase II data).

It may take as long as 30 seconds Phase II data to appear on a call-taker's screen, if it appears at all. PSAPs often do not receive Phase II data or receive Phase II data too late to be of use. Phase II data can be received in the form of a dispatchable address, as a set of GPS coordinates, or both. Phase II data comes with an uncertainty factor that indicates how accurate the Phase II data might be. Phase II data also indicates a radius around the latitude and longitude within which the system determines a 90 percent chance the caller is located.

There are several problems with delivery of location information from cellular providers to 911. One problem is Phase I misroute. Phase I misroute can occur when a cell tower covers more than one jurisdiction. A cell tower has no way of knowing exactly where in a given cell sector a caller is located and each cell sector can only map to one PSAP. Thus, there are many areas of the country were 911 calls end up initially going to the wrong (e.g., adjacent) jurisdiction. Call misrouting can cause significant delays in dispatching appropriate resources.

Another problem is the accuracy and timing of methods providing Phase II data. Because Phase II methods determine addresses after the call reaches the PSAP, Phase II data typically cannot be used when routing a call (e.g., to correct a phase I misroute). Additionally, phase II location methods often fail for callers indoors, where more and more callers are initiating wireless calls. Thus, call takers may be reliant on callers to provide location information.

Additionally, different service providers may provide Phase II data from different service providers in slightly different formats, potentially causing confusion and leading to delay for call-takers and dispatchers.

Any delay in dispatching first responders can result in loss of life. For example, the FCC estimates that 10,000 people could be saved every year in the United States by reducing 911 response times by one minute.

NG911 enhances emergency number services by creating a faster, more resilient system that allows digital information (e.g., voice, photos, videos, text messages) to flow seamlessly from the public, through the 911 network and eventually, directly to first responders. It also enables 911 call centers to transfer 911 calls to other call centers, and help them deal with call overload, disasters, and day-to-day transfer of 911 calls to other jurisdictions.

Lack of accurate caller information also makes it more difficult to determine if a 911 call is a hoax. For example, if a caller is reporting a fire in one location but the caller is in another location 15 miles away, there is an increased chance that the 911 call is a hoax. However, the call-taker/dispatcher may have no way to know the distance between the caller and the reported location (which may both be in range of the same cell tower).

Phones with location services can display location information on screen upon initiation of and during a 911 call. As such, a caller can observe the location on the screen and relay the location back to a call taker. However, to relay the location, the caller has to observe the screen during the call, at least up until the location is requested by a call taker. If a caller is calling 911 to report an incident that happened and/or is happening to him/her, the caller may be injured and/or under physical duress. When a caller is injured (e.g., semi-conscious) and/or is under physical duress, it may be difficult for the caller to observe the screen after dialing "911". It may also be that younger children, especially when scared, lack the mental faculties to understand that the location is displayed on the screen and relay the location back to a call taker.

Further techniques, including Advanced Mobile Location (AML), have been used to determine and automatically send a relatively accurate location of a smart phone. These further techniques send smart phone location to a PSAP in an SMS message. When a 911 (or other emergency) call is initiated, the smart phone determines if a Global Navigation Satellite System (GNSS) receiver and Wi-Fi modules are turned on. (GNSS can include any of GPS, GLONASS, Galileo, Beidou or other regional systems.) If not, the smart phone automatically turns on the GNSS receiver and/or Wi-Fi module in response to the 911 (or other emergency) call being initiated. The smart phone determines its location from GNSS signals and/or from Wi-Fi signals. The smart phone automatically sends an SMS (Short Message Service) message to 911. The SMS message is routed to the PSAP.

However, text messages are not instantaneous and can be delayed. For example, during periods of congestion, such as, due to severe weather, a text message may be delayed by several minutes, or potentially hours. Thus, PSAPs should be aware that texting is not a real-time two-way messaging service. When handling a 9-1-1 text message, communications can be delayed due to waiting for the message sender and PSAP call taker to acknowledge receipt of the message and responding.

There is also some chance that an SMS message is misrouted. For example, a caller can be in voice communication with a call taker at one PSAP and the SMS message can get routed to another different PSAP. Thus, sending an SMS message with smart phone location to 911, does not guarantee that an appropriate PSAP receives the smart phone location in timely manner or that an appropriate PSAP receives the smart phone location at all.

Further even if/when an accurate response location is determined, a call-taker/dispatcher may have difficulty determining what resources to dispatch based on a caller's description of a scene. A caller may give imprecise information or may inadvertently give wrong information. An accurate assessment of a scene may not be possible until some type of first responder arrives. An inaccurate assessment of a scene can make it difficult for call takers/dispatchers to tailor an initial allocation of first responder resources, potentially resulting in under deployment or over deployment. Under deployment can put lives at risks. Over deployment can waste resources.

Accordingly, aspects of the invention can derive a location and other relevant information associated with an event that is the subject of a 911 call. Other relevant information can include one or more of: a context, a validation, a truthfulness, and a severity. The derived relevant information can be sent to a PSAP. A derived location can be relatively more accurate than Phase I data and Phase II data and can be derived in a reduced amount of time.

Other relevant information can include context, a validation, a truthfulness, a severity, etc. Other relevant information can be included in text, images, audio, video, etc. A 911 call location along with other relevant can be sent to an appropriate PSAP.

In one aspect, 911 call locations are pushed to appropriate PSAPs as the 911 calls are received. In another aspect, a PSAP requests locations of 911 calls in their geographic service area. In response, locations for any active 911 calls in the geographic service area are sent to the requesting PSAP.

An event detection infrastructure can derive the location of an event that is the subject of a 911 call. The derived location can be sufficiently accurate to dispatch first responder resources (and more accurate than Phase I and/or Phase II service provider data). The derived location can also be derived and sent to a PSAP more quickly than service provider Phase II data can be provided (if Phase II data is even available). In another aspect, a derived location is used to validate Phase I and/or Phase II service provider data. In a further aspect, a derived location is used to indicate a possible inaccuracy in Phase I and/or Phase II service provider data.

In another aspect, an event detection infrastructure derives a context (e.g., category and or description) for an event that is the subject of a 911 call. The derived context can include details of the event. The derived context can be derived and sent to a PSAP more quickly than a call taker or dispatcher take event details from a caller.

In a further aspect, an event detection infrastructure derives truthfulness for an event that is the subject of the 911 call. The derived truthfulness can indicate a probability that the event is true (vs. a hoax, fake, etc.).

In an additional aspect, an event detection infrastructure derives a severity for an event that is the subject of the 911 call. The derived severity can indicate how severe an event is. For example, a call-taker may receive a call of an accident with a "head injury". However, the call taker may not be able to determine if the accident is a fender bender where an occupant has a small laceration on his/her forehead vs an accident where an occupant has a skull fracture (both of which might be classified as a "head injury"). A severity can provide a call-taker and/or dispatcher additional information about a scene.

An event location, event context, event truthfulness, and event severity can be combined into an event that is sent to a PSAP responsible for 911 calls at the event location.

An mobile phone (and possible event) location can be sent to a PSAP in an SMS message and/or in an audio overlay included in a voice channel.

Thus, aspects of the invention can quickly and accurately provide the location of a 911 call to a dispatcher minimizing delays associated with dispatching first responder resources. Aspects of the invention can also quickly and accurately provide context, truthfulness, and severity to a dispatcher allowing the dispatcher to better allocate resources to the circumstances of calls for service. For example, allocated resources can be more appropriately tailored to a call for service. Tailoring a response can include referring a 911 call to another PSAP.

In general, signal ingestion modules ingest different types of raw structured and/or raw unstructured signals on an ongoing basis. Different types of raw signals can include different data media types and different data formats, including Web signals. Data media types can include audio, video, image, and text. Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), other Multipurpose Internet Mail Extensions (MIME) types, etc. Handling different types and formats of data introduces inefficiencies into subsequent event detection processes, including when determining if different signals relate to the same event.

Accordingly, the signal ingestion modules can normalize raw signals across multiple data dimensions to form normalized signals. Each dimension can be a scalar value or a vector of values. In one aspect, raw signals are normalized into normalized signals having a Time, Location, Context (or "TLC") dimensions.

A Time (T) dimension can include a time of origin or alternatively a "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent a Context (C) dimension. Probability details can indicate (e.g., can include a hash field indicating) a probabilistic model and (express and/or inferred) signal features considered in a signal source probability calculation.

Thus, per signal type, signal ingestion modules determine Time (T), a Location (L), and a Context (C) dimensions associated with a raw signal. Different ingestion modules can be utilized/tailored to determine T, L, and C dimensions associated with different signal types. Normalized (or "TLC") signals can be forwarded to an event detection infrastructure. When signals are normalized across common dimensions subsequent event detection is more efficient and more effective.

Normalization of ingested raw signals can include dimensionality reduction. Generally, "transdimensionality" transformations can be structured and defined in a "TLC" dimensional model. Signal ingestion modules can apply the "transdimensionality" transformations to generic source data in raw signals to re-encode the source data into normalized data having lower dimensionality. Thus, each normalized signal can include a T vector, an L vector, and a C vector. At lower dimensionality, the complexity of measuring "distances" between dimensional vectors across different normalized signals is reduced.

Concurrently with signal ingestion, an event detection infrastructure considers features of different combinations of normalized signals to attempt to identify events of interest to various parties. For example, the event detection infrastructure can determine that features of multiple different normalized signals collectively indicate an event of interest to one or more parties. Alternately, the event detection infrastructure can determine that features of one or more normalized signals indicate a possible event of interest to one or more parties. The event detection infrastructure then determines that features of one or more other normalized signals validate the possible event as an actual event of interest to the one or more parties. Features of normalized signals can include: signal type, signal source, signal content, Time (T) dimension, Location (L) dimension, Context (C) dimension, other circumstances of signal creation, etc.

If the characteristics a raw signal provide insufficient information to derive one or more of: Time (T), Location (L), or Context (C) dimensions, signal enrichment services can refer to/access supplemental enriching data. Signal ingestion modules can then use the supplemental enriching data to derive any of: Time (T), Location (L), and Context (C) dimensions. In one aspect, signal enrichment services request additional raw signals from one or more signal sources. The signal ingestion modules use characteristics of one or more additional raw signals to infer/derive one or more of: a Time (T) dimension, a Location (L) dimension, or Context (C) dimension for the raw signal.

The signal ingestion modules can use defined signal acquisition schemes for a plurality of signal sources (data providers), such as, social networks, social broadcasts, traffic reports, traffic cameras, live weather, etc. A signal acquisition scheme for a signal source can specify a signal acquisition volume corresponding to specified geographic locations at specified time intervals. A signal acquisition scheme can maximize signal acquisition up to some threshold below that permitted by a signal acquisition policy of a signal source. Thus, accessing signals from a signal source in accordance with a signal acquisition scheme does not fully consume that entity's allocated signal acquisition with the signal source. Some amount of allocated signal acquisition is held back to handle on-demand signal access requests (that can potentially occur at any time).

As such, the signal ingestion modules can acquire signals from a plurality of signal sources in accordance with a plurality of corresponding signal acquisition schemes. The signal ingestion modules analyze raw signals from the plurality of signal sources to attempt to identify Time (T), Location (L), and Context (C) dimensions of occurring live events (e.g., fire, police response, mass shooting, traffic accident, natural disaster, storm, active shooter, concerts, protests, etc.).

In one aspect, in response to a subscriber mobile device calling 911, a mobile carrier can create a Call Data Record (CDR) for the 911 call. The carrier can strip personally identifiable information (PII) from the CDR. When location is sent in an SMS message, the carrier can strip PII from the SMS message. The carrier can combine Non-PII data from the CDR and/or from the SMS message with the location into a 911 call Non-PII signal. The carrier sends the 911 call Non-PII a signal to signal ingestion module(s). The signal ingestion modules ingest the 911 call Non-PII signal.

The signal ingestion module(s) normalize the 911 call Non-PII signal and into a normalized format, including time, location, and context dimensions (a "TLC" format).

Content of the 911 call Non-PII signal can used to identify one or more other signals related to the 911 call. The one or more other signals are used to authenticate the 911 call (or determine the 911 call is a hoax). For example, the characteristics of the one or more other signals can corroborate that a reported type of emergency actually occurred and/or is actually occurring. In another aspect, the one or more other signals are used to determine a severity of the reported type of emergency. For example, a 911 caller can call to report an accident. Characteristics of the one or more other signals can indicate how severe the accident is, such as, for example, the extent of injuries, property damage, etc. In a further aspect, the one or more other signals are used to derive situational awareness for the reported type of emergency. For example, characteristics of the one or more signals may include content depicting and/or describing the reported type of emergency. A depiction or description can indicate relevant (and possibly) dangerous situations at a scene (e.g., loose power lines, chemical spills, blocked highway lanes, etc.).

One or more of a validation, a severity, and situational awareness derived from signals related to a 911 call can be sent to a PSAP. The PSAP can use any of the validation, severity, and situational awareness to better tailor or change (including canceling) a response to the reported type of emergency. Tailoring resources can include referring the 911 call to another PSAP. Referring the 911 call can correct misrouting of the 911 call.

In one aspect, an audio overlay is inserted into an audio communication channel between a calling party calling from a mobile phone and a call taker (telecommunicator) at a PSAP. The audio overlay verbally indicates the location of the mobile phone (e.g., in a voice "the call is originating from . . . "). The audio overlay is output at a lower, but discernible, volume relative to the volume of voice communication between the calling party and the call taker. The volume of the audio overlay can be dynamically adjusted based on a detected volume of voice communication so that the calling party and call taker can communicate even if volume of the conversation fluctuates. When voice communication is not detected for a specified period of time, the location of the mobile phone can be verbally indicated in the audio communication channel at a specified (and possibly somewhat increased) volume.

The audio overlay can be repeatedly inserted into the audio communication channel at designated intervals (e.g., every 5-15 seconds). Thus, if a calling party is moving, the calling party can be tracked.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: raw signals, normalized signals, events, mobile phone locations, text messages, audio overlays, transcribed emergency calls, geo cell subsets, voice communication, telephone numbers, phase I data, phase II data, phase II requests, contexts, severity, truthfulness, call creation requests, transcriptions, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, raw signals, normalized signals, events, mobile phone locations, text messages, audio overlays, transcribed emergency calls, geo cell subsets, voice communication, telephone numbers, phase I data, phase II data, phase II requests, contexts, severity, truthfulness, call creation requests, transcriptions, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, an "emergency call" is defined as a call to a designated telephone number assigned to accept calls requesting emergency assistance. The actual number can vary between geographic locations. For example, the number "911" is designated to accept calls requesting emergency assistance in the United States, "999" is designated to accept calls requesting emergency assistance in the United Kingdom, "112" and "119" are designated to accept calls requesting emergency assistance in many other countries. Some countries have different designated numbers for different emergencies. For example, in Japan "110" is used for police and "120" for ambulance.

In this description and the following claims, a "geo cell" is defined as a piece of "cell" in a spatial grid in any form. In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to approximate point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and 1s corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character.

Depending on latitude, the size of an area defined at a specified geo cell precision can vary. When geohash is used for spatial indexing, the areas defined at various geo cell precisions are approximately:

TABLE 1

Example Areas at Various Geohash Precisions

| Geohash Length/Precision | width × height |
| --- | --- |
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Other geo cell geometries, such as, hexagonal tiling, triangular tiling, etc. are also possible. For example, the H3 geospatial indexing system is a multi-precision hexagonal tiling of a sphere (such as the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the approximate locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero (85,011,012 $km^2$) to level 30 (between 0.48 $cm^2$ to 0.96 $cm^2$).

In this description and the following claims, "personal information" is described as one or more portions of data that when considered individually or in the aggregate relate to the identity of a natural person or can be used to identify a natural person. Personal information is defined to include personally identifiable information (PII), sensitive personal information (SPI), or other information that can be used on its own or with other information to identify, contact, or locate a single person, or to identify an individual in context. Personal information can include but is not limited to: full name, first name, last name, home address (or portions thereof), email address, nation identification number, passport number, vehicle registration plate, driver's license, face, fingerprints, handwriting, credit card numbers, digital identity, date of birth, birthplace, login name, social media identifier, mobile telephone number, nickname, age, gender, employer, school name, criminal record, job position, etc Signal Ingestion and Normalization Signal ingestion modules ingest a variety of raw structured and/or raw unstructured signals on an on going basis and in essentially real-time. Raw signals can include social posts, live broadcasts, traffic camera feeds, other camera feeds (e.g., from other public cameras or from CCTV cameras), listening device feeds, emergency (e.g., 911) calls, weather data, planned events, IoT device data, crowd sourced traffic and road information, satellite data, air quality sensor data, smart city sensor data, public radio communication (e.g., among first responders and/or dispatchers, between air traffic controllers and pilots), etc. The content of raw signals can include images, video, audio, text, etc.

In general, signal normalization can prepare (or pre-process) raw signals into normalized signals to increase efficiency and effectiveness of subsequent computing activities, such as, event detection, event notification, etc., that utilize the normalized signals. For example, signal ingestion modules can normalize raw signals, including raw streaming signals, into normalized signals having a Time, Location, and Context (TLC) dimensions. An event detection infrastructure can use the Time, Location, and Content dimensions to more efficiently and effectively detect events.

Per signal type and signal content, different normalization modules can be used to extract, derive, infer, etc. Time, Location, and Context dimensions from/for a raw signal. For example, one set of normalization modules can be configured to extract/derive/infer Time, Location and Context dimensions from/for social signals. Another set of normalization modules can be configured to extract/derive/infer Time, Location and Context dimensions from/for Web signals. A further set of normalization modules can be configured to extract/derive/infer Time, Location and Context dimensions from/for streaming signals.

Normalization modules for extracting/deriving/inferring Time, Location, and Context dimensions can include text processing modules, NLP modules, image processing modules, video processing modules, etc. The modules can be used to extract/derive/infer data representative of Time, Location, and Context dimensions for a raw signal. Time, Location, and Context dimensions for a raw signal can be extracted/derived/inferred from metadata, characteristics of the raw signal, characteristics of other raw signals, characteristics of previously detected events, etc.

For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested raw signal includes sufficient expressly defined time, location, and context information upon ingestion. The expressly defined time, location, and context information is used to determine Time, Location, and Context dimensions for the ingested raw signal. In other aspects, an ingested signal lacks expressly defined location information or expressly defined location information is insufficient (e.g., lacks precision) upon ingestion. In these other aspects, Location dimension or additional Location dimension can be inferred from features of an ingested signal and/or through references to other data sources. In further aspects, an ingested signal lacks expressly defined context information or expressly defined context information is insufficient (e.g., lacks precision) upon ingestion. In these further aspects, Context dimension or additional Context dimension can be inferred from features of an ingested signal and/or through reference to other data sources. Other data sources can include additional raw signals and previously detected events.

In additional aspects, time information may not be included, or included time information may not be given with high enough precision and Time dimension is inferred. For example, a user may post an image to a social network which had been taken some indeterminate time earlier.

Normalization modules can use named entity recognition and reference to a geo cell database to infer Location dimension. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time dimension, a Location dimension, a Context dimension (e.g., single source probabilities and probability details), a signal type, a signal source, and content.

A single source probability can be calculated by single source classifiers (e.g., machine learning models, artificial intelligence, neural networks, statistical models, etc.) that consider hundreds, thousands, or even more signal features of a signal. Single source classifiers can be based on binary models and/or multi-class models.

FIG. 1A depicts part of computer architecture 100 that facilitates ingesting and normalizing signals. As depicted, computer architecture 100 includes signal ingestion modules 101, social signals 171, web signals 172, and streaming signals 173. Signal ingestion modules 101, social signals 171, web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173 (e.g., social posts, traffic camera feeds, other camera feeds, listening device feeds, 911 calls, weather data, planned events, IoT device data, crowd sourced traffic and road information, satellite data, air quality sensor data, smart city sensor data, public radio communication, etc.) ongoing basis and in essentially real-time. Signal ingestion module(s) 101 include social content ingestion modules 174, web content ingestion modules 175, stream content ingestion modules 176, and signal formatter 180. Signal formatter 180 further includes social signal processing module 181, web signal processing module 182, and stream signal processing modules 183.

In general, a raw signal can include various characteristics including one or more of: a time stamp, location information (e.g., lat/lon, GPS coordinates, etc.), context information (e.g., text expressly indicating a type of event), a signal type (e.g., social media, 911 communication, traffic camera feed, etc.), a signal source (e.g., Facebook, twitter, Waze, etc.), and content (e.g., one or more of: image, video, text, keyword, locale, etc.). Streaming signals 173 can include live video and/or non-live (previously stored) video.

For each type of raw signal, a corresponding ingestion module and signal processing module can interoperate to normalize the signal along Time, Location, Context (TLC) dimensions. For example, social content ingestion modules 174 and social signal processing module 181 can interoperate to normalize social signals 171 into TLC dimensions. Similarly, web content ingestion modules 175 and web signal processing module 182 can interoperate to normalize web signals 172 into TLC dimensions. Likewise, stream content ingestion modules 176 and stream signal processing modules 183 can interoperate to normalize streaming signals 173 into TLC dimensions.

In one aspect, signal content exceeding specified size requirements (e.g., audio or video) is cached upon ingestion. Signal ingestion modules 101 include a URL or other identifier to the cached content within the context for the signal.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can insert one or more single source probabilities and corresponding probability details into a normalized signal to represent a Context (C) dimension. Probability details can indicate a probabilistic model and features used to calculate the probability. In one aspect, a probabilistic model and signal features are contained in a hash field.

Signal ingestion modules 101 can utilize "transdimensionality" transformations structured and defined in a "TLC" dimensional model. Signal ingestion modules 101 can apply the "transdimensionality" transformations to generic source data in raw signals to re-encode the source data into normalized data having lower dimensionality. Dimensionality reduction can include reducing dimensionality of a raw signal to a normalized signal including a T vector, an L vector, and a C vector. At lower dimensionality, the complexity and resource consumption of measuring "distances" between dimensional vectors across different normalized signals is reduced.

Thus, in general, any received raw signals can be normalized into normalized signals including a Time (T) dimension, a Location (L) dimension, a Context (C) dimension, signal source, signal type, and content. Signal ingestion modules 101 can send normalized signals 122 to event detection infrastructure 103.

For example, signal ingestion modules 101 can send normalized signal 122A, including time (dimension) 123A, location (dimension) 124A, context (dimension) 126A, content 127A, type 128A, and source 129A to event detection infrastructure 103. Similarly, signal ingestion modules 101 can send normalized signal 122B, including time (dimension) 123B, location (dimension) 124B, context (dimension) 126B, content 127B, type 128B, and source 129B to event detection infrastructure 103.

Event Detection

Figure 1B:
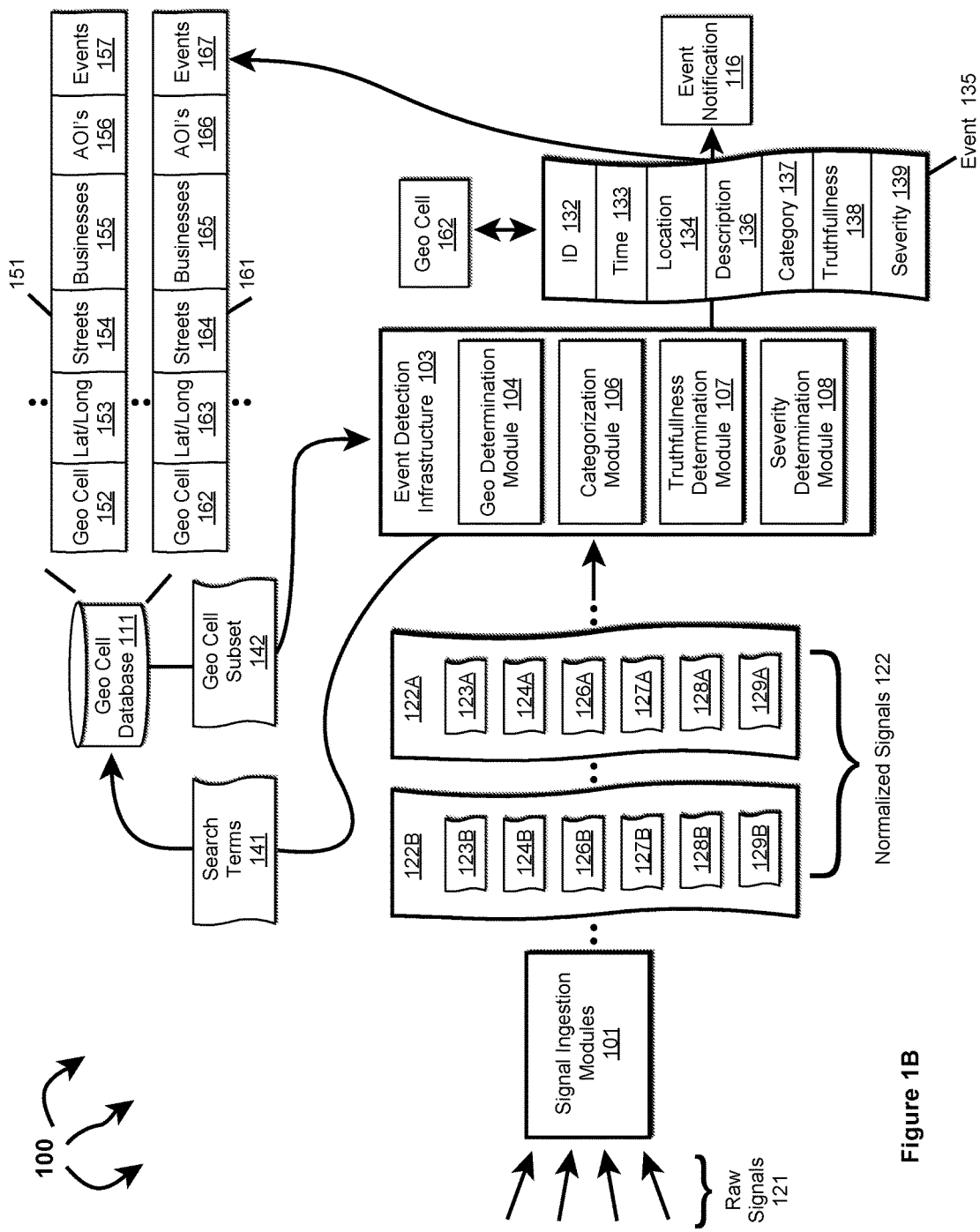
FIG. 1B illustrates an example computer architecture that facilitates detecting events from normalized signals.

FIG. 1B depicts part of computer architecture 100 that facilitates detecting events. As depicted, computer architecture 100 includes event detection infrastructure 103, geo cell database 111 and event notification 116. Geo cell database 111 and event notification 116 can be connected to (or be part of) a network with signal ingestion modules 101 and event detection infrastructure 103. As such, geo cell database 111 and event notification 116 can create and exchange message related data over the network.

As described, in general, on an ongoing basis and concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from Time, Location, and Context dimensions included in normalized signals. Event detection infrastructure can likewise detect changes to existing (planned and unplanned) events. Since, normalized signals are normalized to include Time, Location, and Context dimensions (vectors), event detection infrastructure 103 can handle normalized signals in a more uniform manner. Handling signals in a more uniform manner increases event detection and event change detection efficiency and effectiveness and also reduces resource consumption. For example, Time, Location, and Context vectors of different normalized signals can be compared (instead of comparing along numerous, and possibly differing and/or non-uniform, other dimensions).

Event detection infrastructure 103 can also determine an event truthfulness (e.g., erroneous detection results, detections based on tampered source data, detections of fictional or staged events), event severity, and an associated geo cell. In one aspect, context information in a normalized signal increases the efficiency and effectiveness of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0% (less truthful) to 100% (more truthful). Other truthfulness representations are also possible. For example, truthfulness can be a dimension and/or can be represented by one or more vectors.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible. For example, severity can be a dimension and/or can be represented by one or more vectors.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure.

Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

Event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 104, categorization module 106, truthfulness determination module 107, and severity determination module 108.

Geo determination module 104 can include NLP modules, image analysis modules, etc. for identifying location information from a normalized signal. Geo determination module 104 can formulate (e.g., location) search terms 141 by using NLP modules to process audio, using image analysis modules to process images, etc. Search terms can include street addresses, building names, landmark names, location names, school names, image fingerprints, etc. Event detection infrastructure 103 can use a URL or identifier to access cached content when appropriate.

Categorization module 106 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Truthfulness determination module 107 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Severity determination module 108 can determine the severity of a detected event based on or more of: location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 111 includes a plurality of geo cell entries. Each geo cell entry is included in a geo cell defining an area and corresponding supplemental information about things included in the defined area. The corresponding supplemental information can include latitude/longitude, street names in the area defined by and/or beyond the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 151 includes geo cell 152, lat/lon 153, streets 154, businesses 155, AOIs 156, and prior events 157. Each event in prior events 157 can include a location (e.g., a street address), a time (event occurrence time), an event category, an event truthfulness, an event severity, and an event description. Similarly, geo cell entry 161 includes geo cell 162, lat/lon 163, streets 164, businesses 165, AOIs 166, and prior events 167. Each event in prior events 167 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field). Sufficiently precise geo cells can be used to increase the practicality of storing matching content.

Geo cell database 111 can store geo cell entries in a hierarchical arrangement based on geo cell precision. As such, geo cell information of more precise geo cells is included in the geo cell information for any less precise geo cells that include the more precise geo cell.

Geo determination module 104 can query geo cell database 111 with search terms 141. Geo cell database 111 can identify any geo cells having supplemental information that matches search terms 141. For example, if search terms 141 include a street address and a business name, geo cell database 111 can identify geo cells having the street name and business name in the area defined by the geo cell. Geo cell database 111 can return any identified geo cells to geo determination module 104 in geo cell subset 142.

Geo determination module can use geo cell subset 142 to determine the location of event 135 and/or a geo cell associated with event 135. As depicted, event 135 includes event ID 132, time 133, location 137, description 136, category 137, truthfulness 138, and severity 139.

Event detection infrastructure 103 can also determine that event 135 occurred in an area defined by geo cell 162 (e.g., a geohash having precision of level 7 or level 9). For example, event detection infrastructure 103 can determine that location 134 is in the area defined by geo cell 162. As such, event detection infrastructure 103 can store event 135 in events 167 (i.e., historical events that have occurred in the area defined by geo cell 162). Other events can be stored in events 167 or other geo cell entries as the events are detected. As such, geo cell database can store an event history per cell. Other modules can refer to the event history when appropriate.

Event detection infrastructure 103 can also send event 135 to event notification module 116. Event notification module 116 can notify one or more entities about event 135.

Determining the Location of an Emergency Call

Aspects of the invention identify the location of an emergency (e.g., 911) call based on anonymized data from the emergency call and fragments of one or more other normalized signals. In one aspect, an event associated with a 911 call is detected. Components for identifying 911 call location and detecting events associated with 911 calls are integrated with signal ingestion modules 101 and an event detection infrastructure 103.

Signal ingestion modules 101 can strip private information out of ingested signals during normalization. For example, signal ingestion modules can normalize a 911 call into an anonymized 911 call by removing any personally identifiable information (PII). The signal ingestion modules can strip all PII private information and Call Data Record (CDR) from a 911 call, including the telephone number, subscriber name, and other private metadata. Audio clips associated with a 911 call can be transcribed to text. Private information, such as, a caller's name, call back number, license plate numbers, etc., can be removed from the text.

Event detection structure 103 can identify the location of a 911 call from the characteristics of a normalized anonymized 911 call signal and characteristics of one or more other normalized signals. In one aspect, a normalized anonymized 911 call signal includes Global Positioning System (GPS) or other location information. In another aspect, the location of the 911 call is inferred from characteristics of the one or more other signals.

Event detection infrastructure 103 can also detect an event associated with a 911 call. Data from a normalized anonymized 911 call signal can indicate a potential event. Characteristics of the normalized anonymized 911 signal can be combined with characteristics of one or more other signals. Signal characteristics can include signal type, signal content, signal time, signal location, signal context, signal creator, other circumstances of signal creation, etc. Detected potential events can be categorized into different categories, such as, for example, fire, police response, mass shooting, traffic accident, natural disaster, storm, active shooter, concerts, protests, etc. Potential events can be detected from a single signal or can be detected from multiple signals. Potential events and event categories can be sent to listener 212.

Signal characteristics from the normalized anonymized 911 call signal can be sent to geo determination module 104.

Geo determination module 104 can include modules for processing different kinds of content including the location context, text (e.g., a transcription of a 911 call), images, audio (e.g., a clip of a 911 call), and video (including NG911 content) into search terms. Geo determination module 104 can query geo cell database 111 with search terms formulated from signal content. Geo cell database 111 can return any geo cells having matching supplemental information to a listener. For example, if a search term includes a street name, a subset of one or more geo cells including the street name in supplemental information can be returned to listener 212.

Generally, listener 212 can listen for additional normalized signals related to the potential event associated with a 911 call in an area defined by each of the returned geo cells (and possibly other areas defined by adjacent and/or nearby geo cells). If additional normalized signals related to a potential event are detected, the event detection infrastructure can use any additional normalized signals to validate an event detection.

Figure 2A:
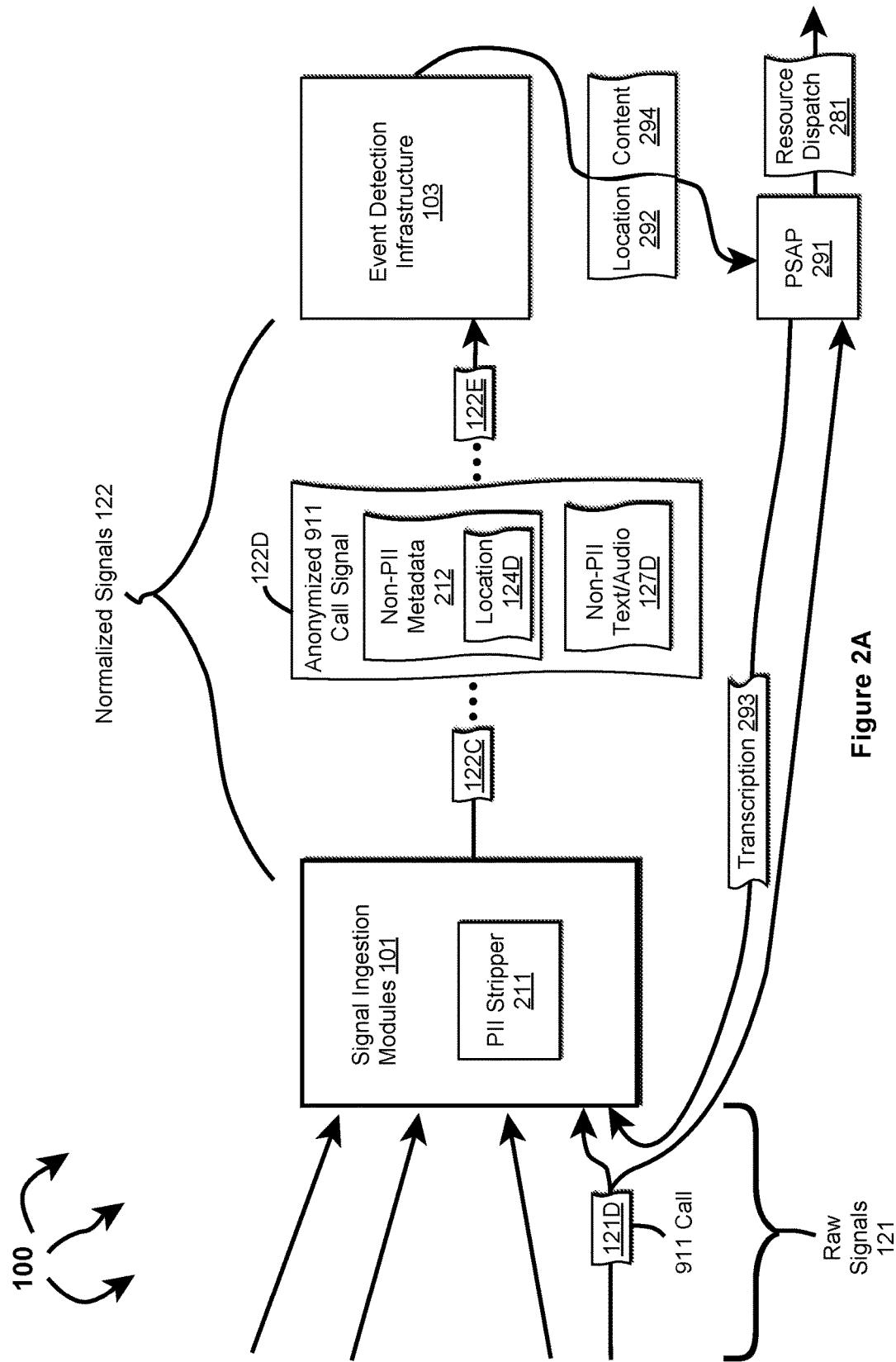
FIG. 2A illustrates an example computer architecture that facilitates sending an emergency call location to a Public Safety Answering Point.

FIG. 2A illustrates computer architecture 100 that facilitates sending an emergency call location to a Public Safety Answering Point. As depicted, computer architecture 100 includes signal ingestion modules 101, event detection infrastructure 103, and PSAP 291 ("Public Safety Answering Point" or "Public Safety Access Point"). Signal ingestion modules 101, event detection infrastructure 103, and PSAP 291 can be connected to (or be part of) a network, such as, for example, a system bus, a Local Area Network ("LAN"), a Wide Area Network ("WAN"), and even the Internet. Accordingly, signal ingestion modules 101, event detection infrastructure 103, and PSAP 291 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

As described, signal ingestion modules 101 can ingest raw signals 121 (e.g., social posts, traffic camera feeds, other camera feeds, listening device feeds, emergency (e.g., 911) calls, emergency (e.g., 911) call transcriptions, weather data, planned events, IoT device data, crowd sourced traffic and road information, satellite data, air quality sensor data, public radio communication, etc.) on an ongoing basis and essentially in real-time.

Generally, signal ingestion modules 101 can homogenize/normalize raw signals 121 into normalized signals 122. Signal ingestion module(s) 101 can send corresponding normalized signals 122 (or parts thereof) to event detection infrastructure 103. Normalization can include removing personal information. For example, PII stripper 211 can strip out personal information from emergency (e.g., 911) call signals and from emergency (e.g., 911) call signal transcriptions. Signal ingestion modules 101 can send normalized anonymized emergency (e.g., 911) call signals and normalized anonymized emergency (e.g., 911) call transcription signals (along with other normalized signals) to event detection infrastructure 103.

Event detection infrastructure 103 can receive a plurality of normalized signals 122, including normalized anonymized emergency (e.g., 911) call signals and normalized anonymized emergency (e.g., 911) call transcription signals, from signal ingestion modules 101. When a normalized anonymized emergency (e.g., 911) call signal or normalized anonymized emergency (e.g., 911) call transcription signal lacks sufficient location information, event detection infrastructure 103 can attempt to derive a more precise location from one or more other normalized signals.

For example, event detection infrastructure 103 can include a location determination module that determines the location of a potential event. The location determination module can derive a location of an emergency (e.g., 911) call from a normalized anonymized emergency (e.g., 911) signal or a normalized anonymized emergency (e.g., 911) call transcription signal along with fragments of other normalized signals.

Whether sufficient location is included in a normalized anonymized emergency (e.g., 911) signal or a normalized anonymized emergency (e.g., 911) call transcription signal or is derived at event detection infrastructure 103, event detection infrastructure 103 can send a location associated with an emergency (e.g., 911) call to PSAP 291. The location can be more accurate phase I and phase II data and can be provided more quickly than phase II data. In one aspect, a emergency (e.g., 911) call location is sent over a cellular link (e.g., a 3G, 4G, 5G, etc. air interface) from event detection infrastructure 103 to PSAP 291

Event detection infrastructure 103 can also enrich a location with content from related normalized signals. The enriching content may provide PSAP 291 with a better understanding of the circumstances of an emergency (e.g., 911) call. For example, if person near the scene of an emergency (e.g., 911) call is live streaming or posts a picture to a social media site, a portion of video or the picture from the scene can be attached to a location.

In one aspect, signal ingestion modules 101 ingest 911 call 121D. Alternately (or in combination), 911 call 121D is received at PSAP 291 and transcribed into transcription 293. PSAP 291 sends transcription 293 to signal ingestion module 101. In another alternative, 911 call 121D is transcribed at another module (e.g., a 3rd party service) and sent to signal ingestion module(s) 101. 911 call 121D can be a wireless call, such as, for example, a cellular call, a WiFi call, a Voice over Internet Protocol (VoIP) call, etc.

PII stripper 211 can strip out personal information from 911 call 121D (and/or from transcription 293). Signal ingestion module 101 can formulate normalized anonymized 911 call signal 122D including non-PII metadata 212 and/or non-PII text/audio 127D. As depicted, non-PII metadata 212 includes location 124D. Signal ingestion modules 101 can send normalized signal 122C, normalized anonymized 911 call signal 122D (or a normalized anonymized 911 call transcription signal), normalized signal 122E, etc. to event detection infrastructure 103. Location 124D can include location data for a mobile telephone that placed 911 call 121D. In another aspect, non-PII metadata 123A does not include location information.

Event detection infrastructure 103 can receive a plurality of normalized signals 122, including normalized anonymized 911 call signal 122D, normalized signal 122C, normalized signal 122E, etc., from signal ingestion modules 101. When a received anonymized emergency (e.g., 911) call lacks location data, event detection infrastructure 103 can attempt to derive the location of the anonymized 911 call from one or more other normalized signals. For example, the location determination module can derive the location of 911 call 121D from fragments of normalized signals 122C and/or 122E (e.g., part of a social media post, a portion of a traffic camera feed, etc. relating to the subject of 911 call 121D).

Event detection infrastructure 103 can determine 911 call 121D originated at location 292. Whether location 292 is included in non-PII metadata 212 or derived at event detection infrastructure 103, event detection infrastructure 103 can send location 292 to PSAP 291. Location 292 can be more accurate than phase I and phase II data. Location 292 can be provided to PSAP 291 more quickly than phase II data and possibly also more quickly than phase I data. In one aspect, location 292 is sent over a cellular link (e.g., a 3G, 4G, 5G, etc. air interface) from event detection infrastructure 103 to PSAP 291.

Event detection infrastructure 103 can also enrich location 292 with content 294 from related signals (e.g., from normalized signals 122C, 122E, etc.). The enriching content may provide PSAP 291 with a better understanding of the circumstances of 911 call 121D. For example, if person near the scene of 911 call 121D is live streaming or posts a picture to a social media site, a portion of the live stream or the picture can be included in content 294.

Based on location 292 (possibly in addition with content 294) personnel at PSAP 291 can tailor dispatch of emergency resources responding to 911 call 121D. Knowing the location and additional information about a scene can reduce the possibility of under allocating or over allocating first responder resources.

Figure 2B:
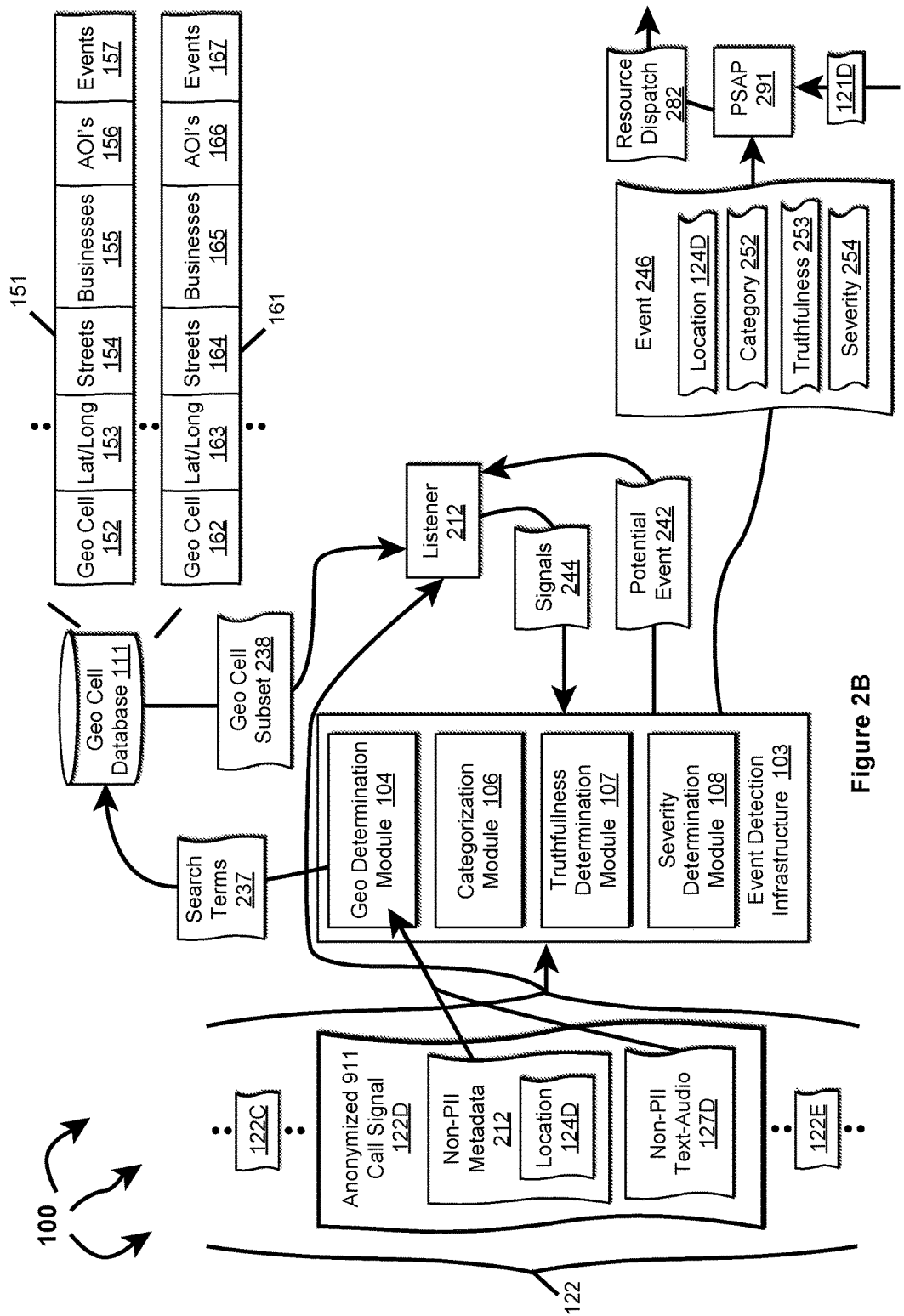
FIG. 2B illustrates an example computer architecture that facilitates sending an event to a Public Safety Answering Point.

FIG. 2B illustrates computer architecture 100 that facilitates sending an event to a Public Safety Answering Point. As described, computer architecture 100 additionally includes listener 212. Event detection infrastructure 103 can detect potential event from a normalized anonymized emergency (e.g., 911) call signal and/or a normalized anonymized emergency (e.g., 911) call transcription signal. A potential event can be in any of a variety of different categories, such as, for example, fire, police response, natural disaster, storm, active shooter, concert, protest, etc. Event detection infrastructure 103 can send the potential event to listener 212. In general, listener 212 can listen for additional normalized signals 122 related to a potential event in areas defined by geo cells in a geo cell subset.

Geo determination module 104 can derive search terms from a normalized anonymized emergency (e.g., 911) call signal or a normalized anonymized emergency (e.g., 911) call transcription signal. Geo determination module 104 can query geo cell database 111 with the search terms. Geo cell database 111 can identify any geo cells having supplemental information (e.g., street address, business names, etc.) that matches the search terms. Geo cell database 111 can return any identified geo cells to listener 212 in a geo cell subset.

Listener 212 can listen for additional normalized signals related to the potential event in the identified geo cells. Normalized signals related to the potential event can be sent to event detection infrastructure 103. Event detection infrastructure 103 can use the additional normalized signals to determine the validity of the potential event.

Geo determination module 104 can determine a location of the event. In one aspect, geo determination module 104 derives an event location from express location information (e.g., latitude and longitude, region identifier, etc.) contained in a normalized signal (or normalized signals) used during event detection. In another aspect, geo determination module 104 infers an event location from other information contained in and/or associated with a normalized signal (or normalized signals) used during event detection. For example, a normalized anonymized 911 call signal may contain content, such as, text, images, audio, video, etc. Location information can be included in the signal content. Location derivation module 104 can infer an event location from the signal content.

For example, a social post may include text stating that "there is a car on fire at the walmart on parleys way" and may include an image of a burning car with the walmart logo visible on building in the background. Detecting a logo can help localize a report. Through natural language processing and/or image analysis, geo determination module 104 can infer an event location from the text and image.

Event detection infrastructure can send a detected event, including location, category, truthfulness, and severity to PSAP 291. Based on event information personnel at PSAP 291 can tailor dispatch of emergency resources responding to 911 call 121D. Knowing a location, category, truthfulness, and severity associated with an emergency (e.g., 911) call can reduce the possibility of under allocating or over allocating first responder resources. Tailoring resources can include referring the emergency (e.g., 911) call to another PSAP. Referring the emergency (e.g., 911) call can correct misrouting of the emergency (e.g., 911) call.

Figure 3:
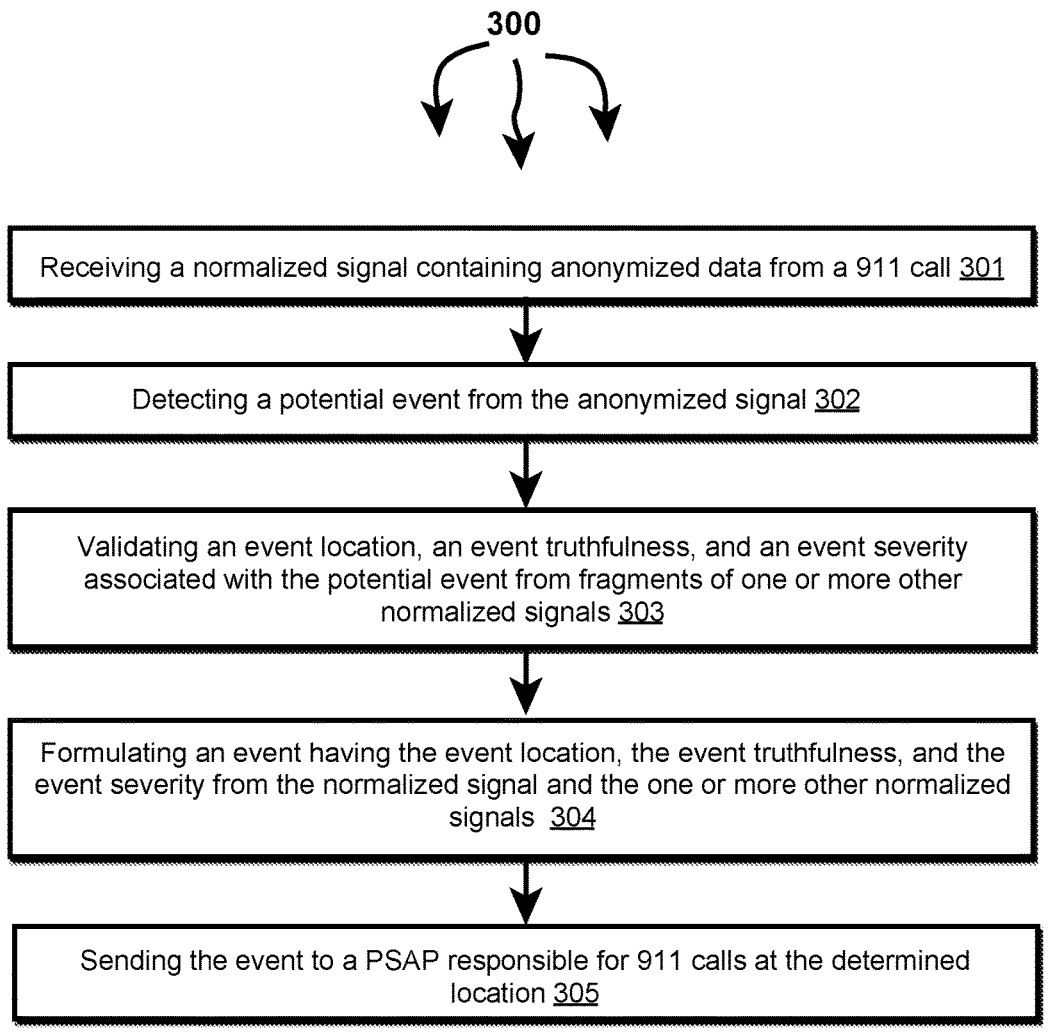
FIG. 3 illustrates a flow chart of an example method for determining an emergency call location.

FIG. 3 illustrates a flow chart of an example method 300 for determining an emergency call location. Method 300 will be described with respect to the components and data of computer architecture 100 (primarily in FIG. 2B).

Method 300 includes receiving a normalized signal containing anonymized data from a 911 call (301). For example, event detection infrastructure 103 can receive normalized anonymized 911 call signal 122D from signal ingestion modules 101. Normalized anonymized 911 call signal 122D can be a normalized signal corresponding to 911 call 121D (a raw signal). As depicted, normalized anonymized 911 call signal 122D includes non-PII metadata 212 (including location 124D) and non-PII text/audio 127D.

Method 200 includes detecting a potential event from the anonymized data (302). For example, event detection infrastructure 103 can detect potential event 242 from non-PII metadata 212 (including location 124D) and non-PII text/audio 127D. Event detection infrastructure 103 can send potential event 242 to listener 212.

Method 300 includes validating an event location, an event truthfulness, and event severity associated with the potential event form fragments of one or more other normalized signals (303). Method 300 includes formulating an event having the event location, the event truthfulness, and the event severity from the normalized signal and the one more other normalized signals (304). For example, geo determination module 104 can derive search terms 237 from non-PII metadata 212 (including location 124D) and/or non-PII text/audio 127D. Geo determination module 104 can query geo cell database 111 with search terms 237. Geo cell database can return geo cell subset 238 to listener 212. Geo cell subset 238 can include one or more geo cells having supplemental information matching search terms 237.

Listener 212 can listen for additional signals in each geo cell included in geo cell subset 238. Listener 212 can detect normalized signals 244 in one or more geo cells. Listener 212 can return normalized signals 244 to event detection infrastructure 103.

Event detection infrastructure 103 can validate potential event 242 as an actual event based on characteristics of normalized signals 244. Geo determination module 104 can validate location 124D, truthfulness determination module 107 can validate truthfulness 253, and severity determination module 108 can validate severity 254. Categorization module 106 can also determine category 252. Event detection infrastructure 103 can formulate event 246 including location 124D, truthfulness 253, severity 254, and category 252.

Method 300 includes sending the event to a PSAP responsible for 911 calls in the determined location (305). For example, event detection infrastructure 103 can send event 246 to PSAP 291. PSAP 291 can be responsible for handling 911 calls at location 124D. PSAP 291 can use information in event 246 to tailor a response to 911 call 121D. For example, PSAP 291 can tailor resource dispatch 282 based on the information in event 246 to mitigate the possibility under allocation or over allocation of first responder resources responding to 911 call 121D.

Tailoring resources can include referring a 911 call to another PSAP. Referring the 911 call can correct misrouting of the 911 call. For example, 911 call 121D can be rerouted to another PSAP.

Figure 2C:
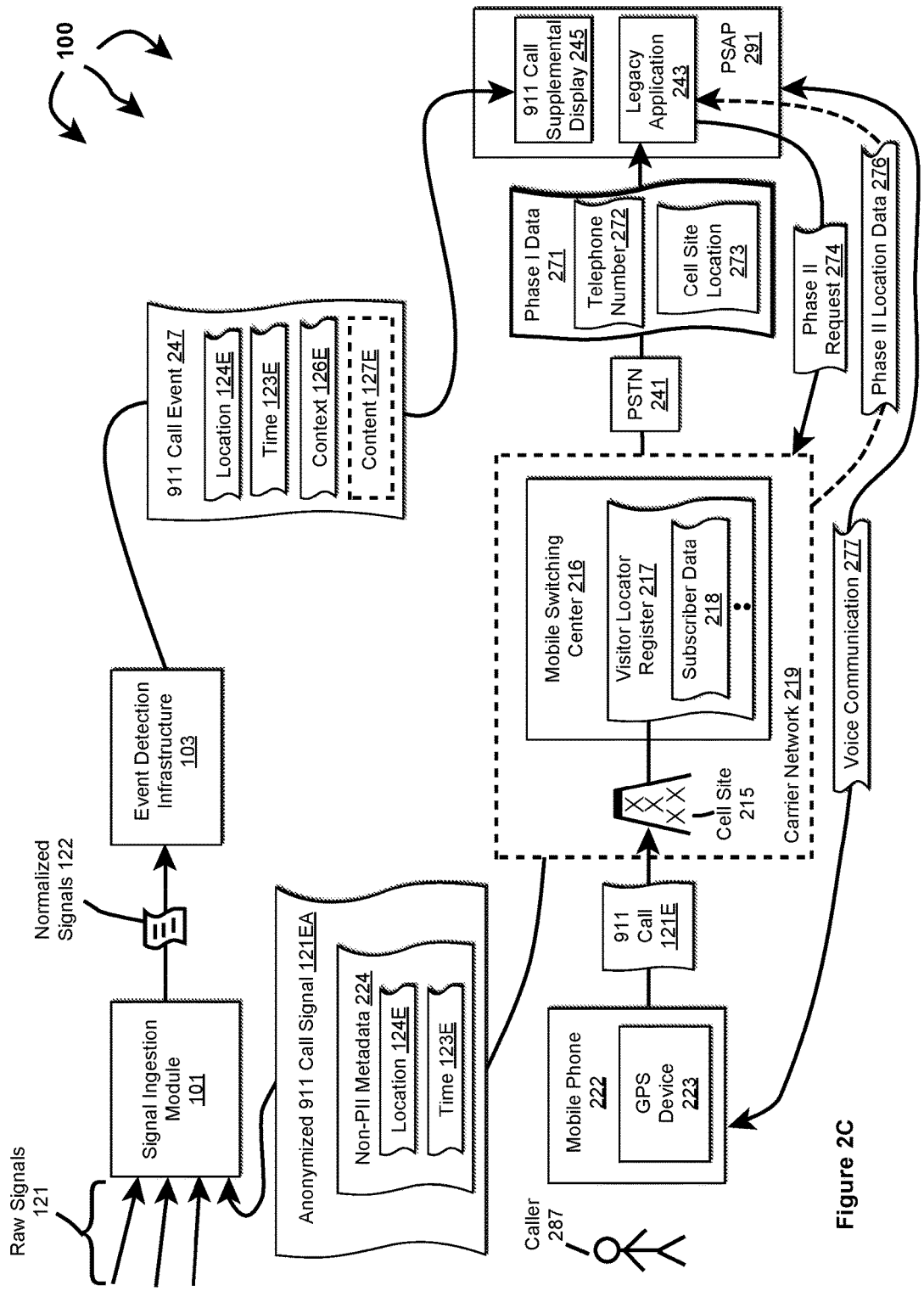
FIG. 2C illustrates an example computer architecture that facilitates sending an emergency call event to a Public Safety Answering Point.

FIG. 2C illustrates computer architecture 100 that facilitates sending an emergency call event to a Public Safety Answering Point. As depicted, computer architecture 100 additionally includes mobile phone 222, carrier network 219, and Public Switched Telephone Network (PSTN) 241. Mobile telephone 222 further includes GPS device 223, which can determine the location of mobile telephone 222. PSAP 291 further includes legacy application 243 and 911 call supplemental display 245.

Mobile phone 222 can send call initiation requests that are received at carrier network 219. For example, cell site 215 can receive a call initiation request and route the call initiation request to mobile switching center (MSC) 216. Mobile phone 222 may have previously registered with MSC 216. As such, subscriber data 218 for mobile phone 222 is included in visitor locator record (VLR) 217. MSC 216 can allocate a receive frequency for the call and creates a corresponding call detail record (CDR) for the call.

MSC 216 routes the call creation request to another appropriate network, such as, another carrier network or PTSN 241. The other network establishes a voice connection between a receipt device and MSC 216. Mobile device 222 can then use send and receive frequencies to communicate to cell site 215. MSC 216 converts between voice communication of the other network. Voice communication can go through various transformations, translations, etc. between MSC 216 and other networks.

Figure 4:
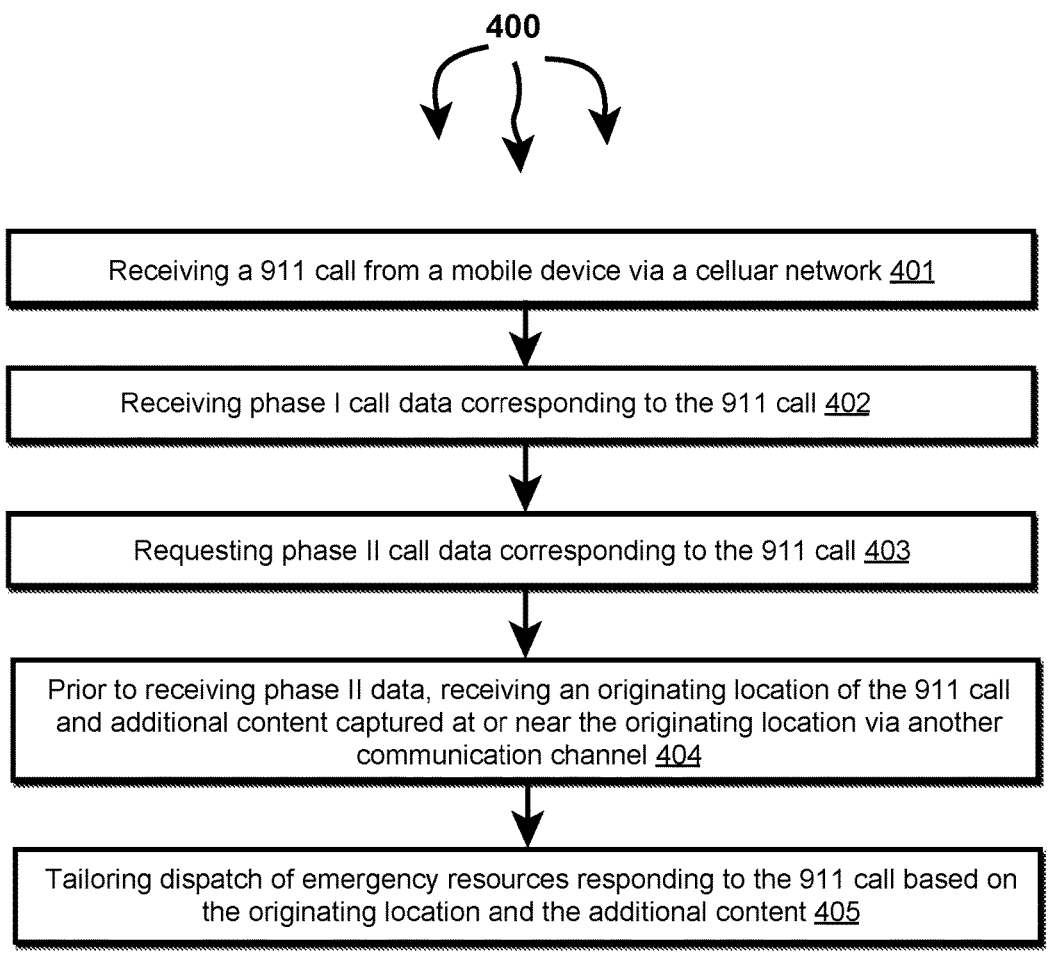
FIG. 4 illustrates a flow chart of an example method for sending an emergency call location to a that facilitates sending an event to a Public Safety Answering Point.

FIG. 4 illustrates a flow chart of an example method 400 for responding to an emergency call. Method 400 will be described with respect to the components and data of computer architecture 100 (primarily in FIG. 2C).

Method 400 includes receiving a 911 call from a mobile device via a cellular network (401). For example, caller 287 can initiate 911 call 121E at mobile phone 222. Carrier network 219 can receive 911 call 121E from mobile phone 222 at cell site 215. MSC 216 can refer to subscriber data 218 in VLR 217. Based on subscriber data 218, MSC 216 can establish voice communication 277 between mobile phone 222 and PSAP 291 through carrier network 219 and PSTN 241. Carrier network 219 can also route phase I data 271 through PSTN 241 to PSAP 291. As depicted, phase I data includes telephone number 272 (of mobile device 222) and cell site location 273 (the location of cell site 215).

Carrier network 219 can also strip PII from 911 call 121E. Carrier network 219 can formulate anonymized 911 call signal 12 IEA including non-PII metadata 224. Carrier network 219 can send anonymized 911 call signal 121EA to signal ingestion modules 101. As depicted, non-PII metadata 224 includes location 124E and time 123E. Signal ingestion modules 101 can normalized anonymized 911 call signal 121EA into an anonymized normalized signal. The anonymized normalized signal can be included in normalized signals 122 sent to event detection infrastructure 103.

Event detection infrastructure 103 can detect 911 call event 247 from the characteristics of the anonymized normalized signal, possibly along with the characteristics of one or more other normalized signals. 911 call event 247 can include location 124E, time 123e, context 126E, and content 127E.

Method 400 includes receiving phase I call data corresponding to the 911 call (402). For example, legacy application 243 can receive phase I data 271. Method 400 includes requesting phase II data corresponding to the 911 call (403). For example, legacy application 243 can send phase II request (rebid) to carrier network 219.

Carrier network 219 may or may not be able to derive phase II data in response to phase II request 274. It may take multiple requests (rebids) and/or some amount of time before phase II data is derived. In one aspect, carrier network 219 eventually sends phase II location data 274 to legacy PSAP 291. In another aspect, carrier 219 is unable to derive phase II location data in a relevant amount of time or at all.

Method 400 includes prior to receiving phase II data, receiving an originating location of the 911 call and additional content captured at or near the originating location via another communication channel (404). For example, prior to receiving phase II location data 274 (if phase II location data 274 is even received), event detection infrastructure can send 911 call event 247 to 911 call supplemental display 245. 911 call supplemental display 245 can receive 911 call event 247 from event detection infrastructure 103. Characteristics of 911 call event 247, including any of location 124E, time 123E, context 126E, and content 127E, can be displayed at 911 call supplemental display 245.

Method 400 includes tailoring dispatch of emergency resources responding to the 911 call based on the originating location and the additional content (405). For example, personnel at PSAP 291 can tailor dispatch of emergency resources responding to 911 call 121E based on any of location 124E, time 123E, context 126E, and content 127E. Tailoring resources can include referring the 911 call to another PSAP. Referring the 911 call can correct misrouting of the 911 call.

Supplementing 911 Call Location with Additional Relevant Information

Figure 5A:
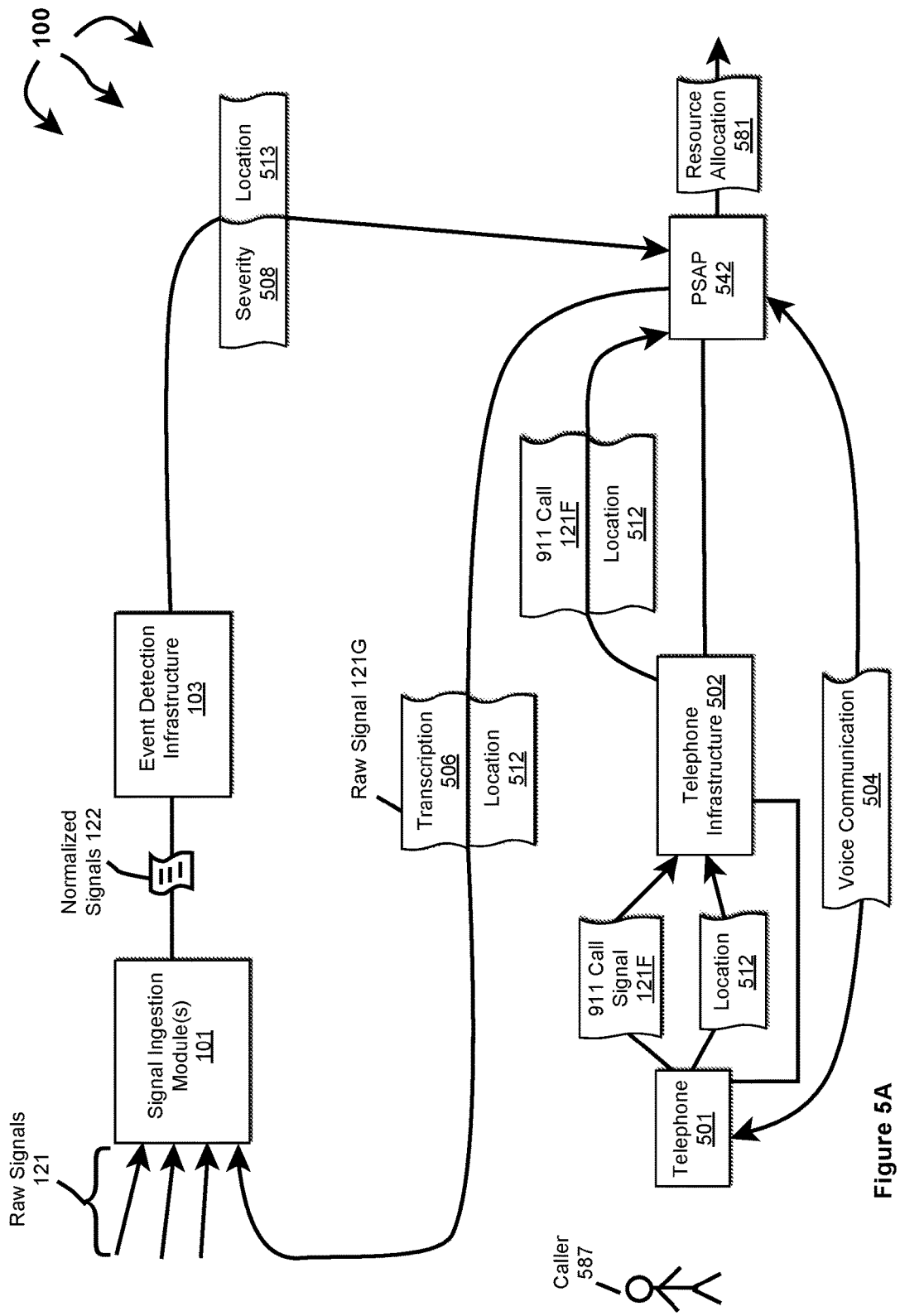
FIG. 5A illustrates an example computer architecture that facilitates sending a mobile phone generated emergency call location and a severity to a Public Safety Answering Point.
Figure 6:
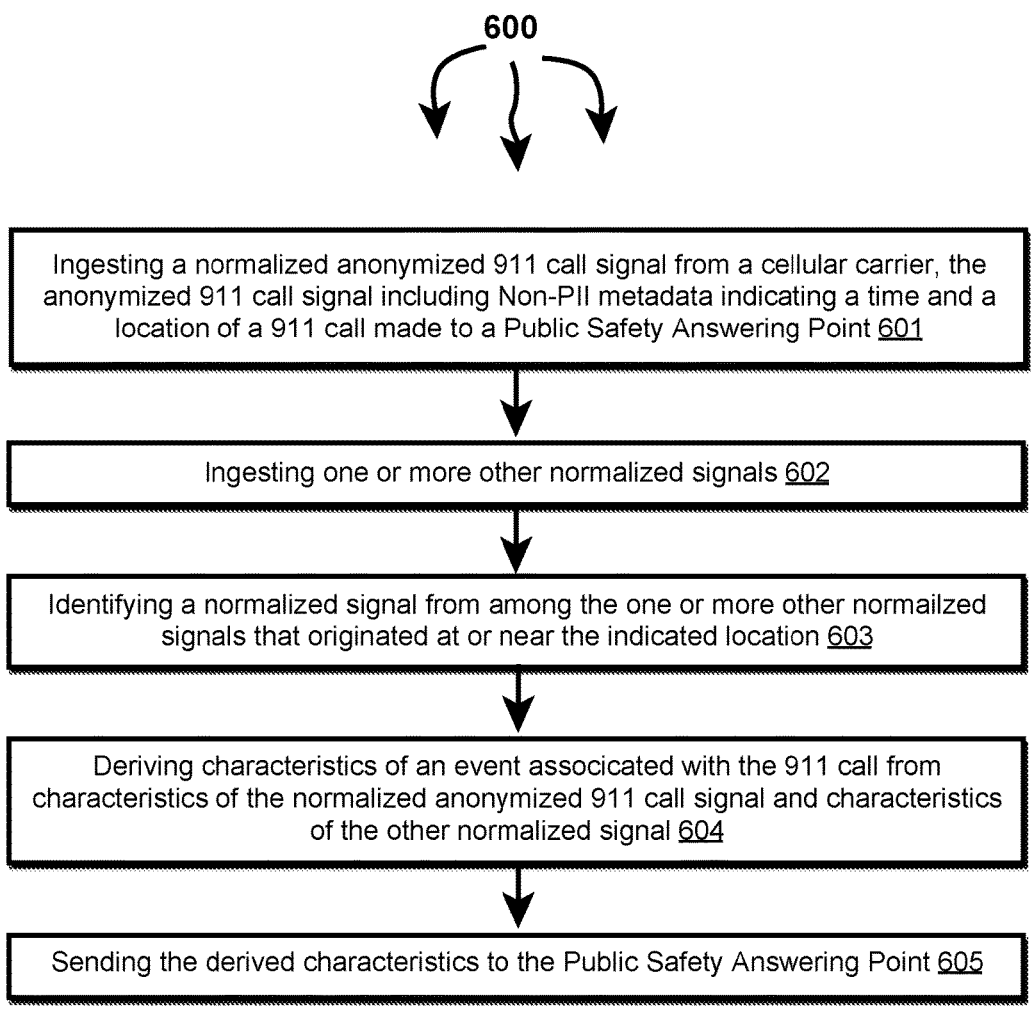
FIG. 6 illustrates a flow chart of an example method for sending characteristics of an event to a Public Safety Answering Point.

Turning to FIG. 5A, FIG. 5A depicts computer architecture 100 that facilitates sending a mobile phone generated emergency call location and a severity to a Public Safety Answering Point. FIG. 6 illustrates a flow chart of an example method 600 for sending characteristics of an event to a Public Safety Answering Point. Method 600 will be described with respect to the components and data of computer architecture 100 (primarily in FIG. 5A).

Caller 587 can dial 911 on telephone 501. On a landline phone, caller 587 can enter the numbers "911". On a mobile phone, caller 587 can enter "911" and select a send function. Telephone 501 can send 911 call signal 121F to telephone infrastructure 502. 911 call 121F signal can be a call creation request to establish a voice connection to an emergency call taker. In one aspect, telephone 501 associates location 512 with 911 call signal 121F. For example, telephone 501 may be a mobile phone using Advanced Mobile Location (AML). In another aspect, telephone 501 does not associate location information with 911 call signal 121F.

911 call signal 121F is received at telephone infrastructure 502. Telephone infrastructure 502 can include components from one or more of: a PSTN, a wireless carrier network, or a Voice over IP (VoIP) network. Telephone infrastructure 502 can determine that 911 call signal 121F is an emergency call and route 911 call signal 121F to PSAP 542. In one aspect, telephone infrastructure 502 derives or has access to location 512. For example, if telephone 501 is a landline, a PSTN can refer to a subscriber database to access location 512 of telephone 501. The PSTN can append an Automatic Location Identifier (ALI) including location 512 to 911 call signal 121F.

In another aspect, telephone 501 is a mobile phone. A mobile carrier network can determine the location of telephone 501, for example, by querying telephone 501, or through one or more: cell identification, triangulation, or trilateration. However, location 512 may be determined after voice communication 504 is established. For example, a less accurate location may be determined (e.g., Phase I data) that is subsequently refined into more accurate data (e.g., Phase II data).

For a call from a mobile phone, a call creation request is sent to a cell site and then forwarded to a mobile switching center (MSC). The mobile phone may have previously registered with the MSC. As such, subscriber data for the mobile phone is included in a visitor locator record (VLR). The MSC allocates a send and receive frequency for voice communication 504. The MSC also creates a call detail record (CDR) for a call between telephone 501 and PSAP 542.

The mobile switching center routes the call creation request to a PSTN. The PSTN establishes a voice connection between PSAP 542 and the MSC. The mobile phone can then use the send and receive frequencies for wireless voice communication to/from the cell site. The MSC converts between wireless and wired voice communication. Wired voice communication can go through various transformations, translations, etc. between the MSC, through the PSTN, to PSAP 542. When the voice connection is established, telephone phone 501 and PSAP 542 can exchange voice communication 504. Caller 587 can relay the nature of an emergency or other reason for calling 911 to a call taker at PSAP 542. The call taker can verbally request a location of the emergency or other situation from caller 587.

The call taker can validate a location given by caller 587 with location 512 or vice versa. As voice communication 504 occurs, voice communication 504 can be transcribed to text. PSAP 542 can strip PII from 911 call signal 121F. PSAP 242 (or a third party service) can send raw signal 121G, including transcription 506 and location 512, to signal ingestion module 101. Signal ingestion modules 101 can ingest raw signal 121G, normalize raw signal 121G, and include transcription 506 and location 512 in normalized signals 122.

Method 600 includes receiving a normalized anonymized call signal from a cellular carrier, the anonymized 911 call signal including non-PII metadata indicating a time and a location of a 911 call made to a Public Safety Answering Point (601). For example, event detection infrastructure 103 can receive a normalized signal 122 normalized from raw signal 121G.

Method 600 includes receiving one or more other normalized signals (602). For example, event detection infrastructure 103 can receive one or more additional normalized signals 122.

Method 600 includes identifying a normalized signal from among the one or more other normalized signals that originated at or near the indicated location (603). For example, event detection infrastructure 103 can identify another normalized signal at or near the location of the normalized signal normalized from raw signal 121G.

Method 600 includes deriving characteristics of an event associated with the 911 call from characteristics of the anonymized 911 call signal and characteristics of the other normalized signal (604). For example, event detection infrastructure 103 can derive characteristics of an event associated with 911 call signal 121F from characteristics of the normalized signal normalized from raw signal 121G and the other normalized signal.

In one as aspect, event detection infrastructure 103 can determine severity 508 of an event corresponding to 911 call signal 121F. Event detection infrastructure 103 can determine severity 508 solely from the content of raw signal 512G or from considering transcription 506 and location 512 in view of the content of other normalized signals.

Method 600 includes sending the derived characteristics to the Public Safety Answering Point (605). For example, event detection infrastructure can send severity 508 and location 513 to PSAP 542.

Severity 508 and location 513 may be received at PSAP 542 during voice communication 504 (e.g., before the 911 call ends). PSAP 542 can match severity 508 to voice communication 504 based on location 513. In one aspect, location 513 and location 512 are the same location. In another aspect, location 513 and location 512 differ but are with a specified proximity of one another. For example, locations 512 and 513 can be nearby or adjacent addresses on the same street, location 512 can be an intersection and location 513 can be the name of a business on a corner of the intersection, locations 512 and 513 can be nearby (e.g., adjacent) geo cells of a specified precision, etc.

Based on the proximity of location 512 to location 513, a call taker can infer that 911 call signal 121F relates to the event identified by event detection infrastructure 103. As such, severity 508 can guide the call taker when requesting further information from caller 587. Severity 508 can change (e.g., increasing or decreasing) as additional signals are ingested and considered by event detection infrastructure 103. The call taker can correspondingly change questioning to adapt to changing severity.

Severity 508 can continue to be updated at CAD after details associated with 911 call signal 121F are forwarded to CAD. Updated severity can be sent to CAD. Thus, dispatchers can adjust dispatched resources (e.g., resource allocation 581) to better align with an event as severity changes. For example, dispatcher can notify responding units to transition to an emergency response (e.g., activating lights and/or sirens) when severity increases.

Event detection infrastructure 103 can similarly determine a truthfulness (or lack thereof) of an event associated the 911 call (based on transcription 206 and possibly in consideration of other normalized signals). Event detection infrastructure 103 can send a truthfulness to PSAP 542. A call taker can use the truthfulness to validate or invalidate a 911 call. Truthfulness can also change (e.g., increasing or decreasing) as additional signals are ingested and considered by event detection infrastructure 103. A call taker can correspondingly change questioning to adapt to changing truthfulness.

Truthfulness can continue to be updated at CAD after details of 911 call signal 121F are forwarded to CAD. Updated truthfulness can be sent to CAD. Thus, dispatchers can adjust dispatched resources to better align with an event as truthfulness changes. For example, a dispatcher can call off an emergency response (e.g., deactivate lights and/or sirens) (or call off a response all together) when an event is invalidated.

Event detection infrastructure 103 can also identify relevant content, such as, for example, text, images, video, audio, etc. related to 911 call signal 121F. Content can be included in other signals at or near location 512. Event detection infrastructure 103 can send content to PSAP 542. The content can provide a call taker with situational awareness of an event (as well as evidence of truthfulness and/or severity). A call taker can correspondingly change questioning based on provided situational awareness. As additional content is detected, the additional content can be sent to PSAP 542.

Content may continue to be detected after details of the 911 call signal 121F are forwarded to CAD. Additional detected content can be sent to CAD. Thus, dispatchers can adjust dispatched resources to better align with an event as situational awareness changes.

Figure 5B:
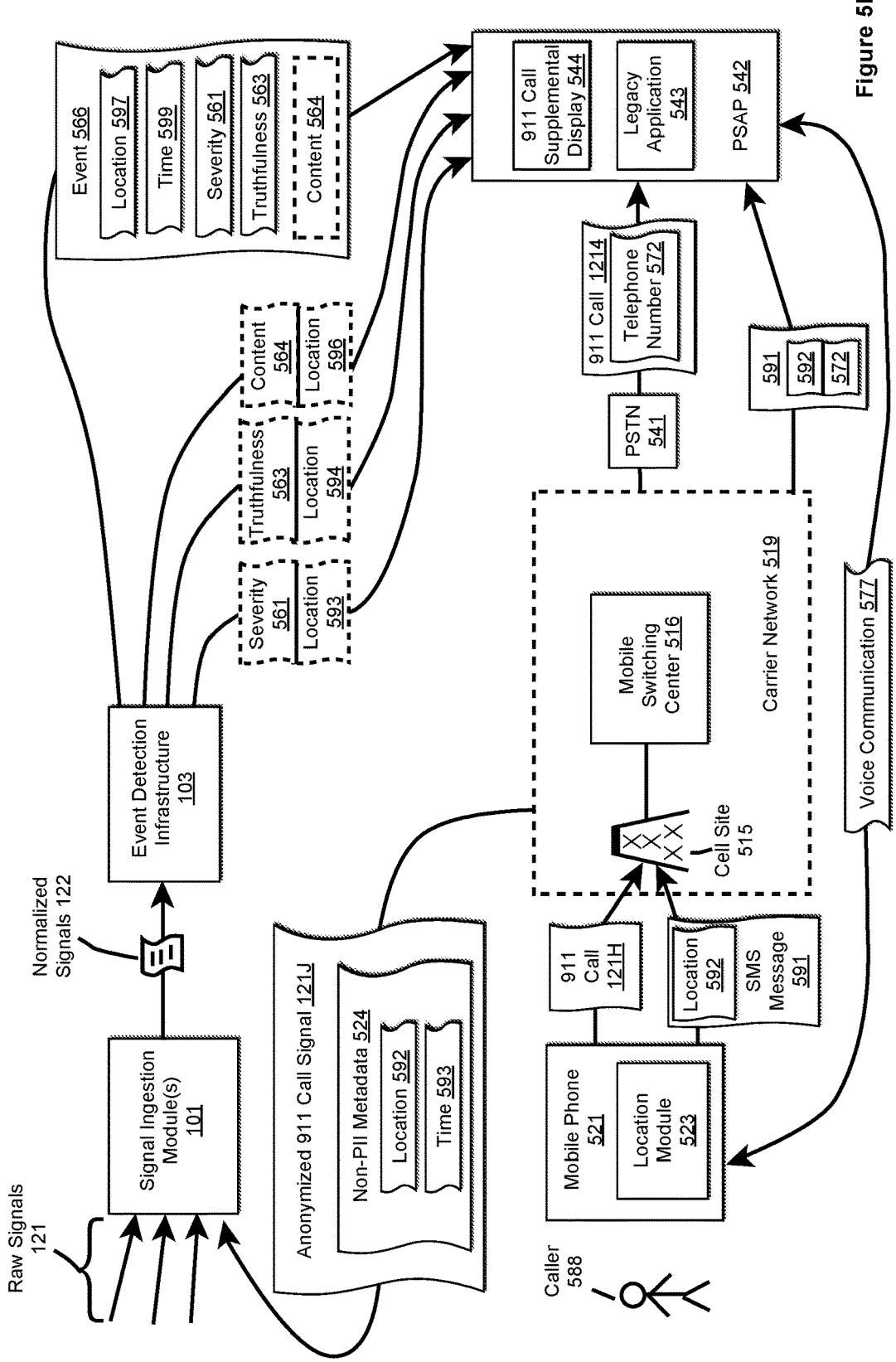
FIG. 5B illustrates an example computer architecture that facilitates sending an event associated with a mobile phone generated location to a Public Safety Answering Point.

FIG. 5B illustrates an example computer architecture 100 that facilitates sending an event associated with a mobile phone generated location to a Public Safety Answering Point. More specifically, turning to FIG. 5B, caller 588 can enter "911" at mobile phone 521 and select "send". In response, mobile phone 211 sends 911 call 121H to carrier network 219. 911 call 121H is received at cell site 515 and MSC 516 forwards 911 call 121H to PSTN 541. PSTN 541 sends telephone number 572 of mobile phone 521 to PSAP 542. A voice connection is established, and mobile phone 521 and PSAP 542 can conduct voice communication 577.

Concurrently, location module 523 can determine location 592 of mobile phone 521. In one aspect, location module 523 access GPS coordinates of mobile phone 521 from a GPS module at mobile phone 521. Mobile phone 521 sends SMS message 591, including location 592, to PSAP 542. SMS message 591 is received at cell site 515 and MSC 516 routes SMS message 591, including location 592 and telephone number 572, to PSAP 542. PSAP 542 can use telephone number 572 to determine that location 592 is associated with mobile phone 521.

Carrier network 519 can also determine from 911 call 121H and SMS message 591 that mobile phone was at location 592 around time 593 (the time 911 call 121H was initiated). In other aspects, carrier network 519 uses cell site location, triangulation, or trilateration to determine (a possible less accurate) location of mobile phone 521.

MSC 516 can strip any PII from a call data record (CDR) for 911 call 121H and from SMS message 591. MSC 516 (or other carrier components) can combine the stripped CDR with location 592 and time 593 into Non-PII metadata 524. MSC 516 can send anonymized 911 call signal 121J, including Non-PII metadata 524, to signal ingestion modules 101. Signal ingestion modules 101 can ingest anonymized 911 call signal 121J along with other raw signals 121. As described, signal ingestion modules 101 can normalize raw signals 121, including anonymized 911 call signal 121J, into normalized signals 122.

From normalized signals 122, event detection infrastructure 103 can detect/determine/identify one or more of: severity 561, truthfulness 563, and content 564 for an event (e.g., the event reported by caller 288) associated with 911 call 121H. Event detection infrastructure 103 can detect/determine/identify severity 561, truthfulness 563, and content 564 at different times as additional signals are ingested and considered. Event detection infrastructure 103 can send severity 561, truthfulness 563, and content 564 along with a location (e.g., 593, 594, or 596) to PSAP 542 as they are detected/determined. Thus, severity 561, truth 563, and content 564 can be sent to PSAP 542 at different times as a scene develops.

Figure 7:
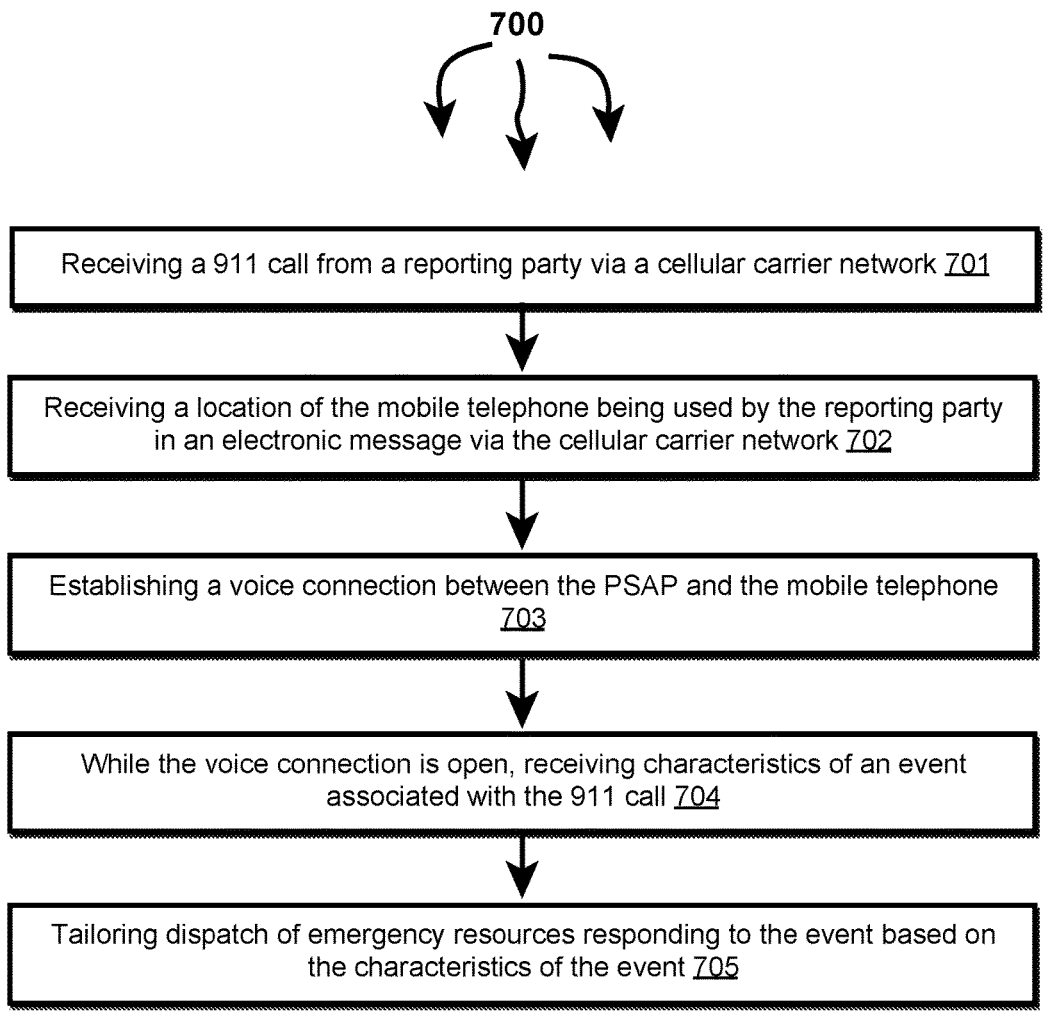
FIG. 7 illustrates a flow chart of an example method for tailoring an emergency response based on characteristics of a detected event.

FIG. 7 illustrates a flow chart of an example method 700 for tailoring an emergency response based on characteristics of a detected event. Method 700 will be described with respect to the components and data of computer architecture 100 (primarily in FIG. 5B).

Method 700 includes receiving a 911 call from a reporting party via a cellular carrier network (701). For example, mobile phone 521 can send 911 call 121H to carrier network 519. Carrier network 519 can route 911 call 121H to PSTN 541. PSTN can in turn route 911 call 121H to PSAP 542. PSAP 542 can receive 911 call 121H, including telephone number 572, from caller 588 via cellular network 519 and PSTN 541.

Method 700 includes receiving a location of the mobile telephone being used by the reporting party in an electronic message via the cellular carrier network (702). For example, mobile phone 521 can send SMS message 591, including location 592, to carrier network 519. Carrier network 519 can route SMS message 591 to PSAP 542. PSAP 542 can receive SMS message 591, including location 592 and telephone number 572, from mobile phone 521.

Method 700 includes establishing a voice connection between the PSAP and the mobile telephone (703). For example, MSC 516 can establish a voice connection between mobile phone 521 and PSAP 542. Caller 588 and call taker personnel at PSAP 542 can exchange voice communication 577 over the voice connection. Method 700 includes, while the voice connection is open, receiving characteristics of an event associated with the 911 call (704). For example, PSAP 542 can receive any of severity 561 and location, 593, truthfulness 563 and location 594, content 564 and location 596. In one aspect, PSAP 542 receives event 566, including location 597, time 599, severity 561, truthfulness 563, and content 564. 911 call display can present any of locations 593, 594, 596, or 597, time 593, severity 561, truthfulness 563, or content 564 at PSAP 542.

Method 700 includes tailoring dispatch of emergency resources responding to the event based on characteristics of the event (705). For example, resources responding to with 911 call 121H can be tailored based on event 566. Tailoring resources can include referring the 911 call to another PSAP. Referring the 911 call can correct misrouting of 911 call 121H.

In one aspect, PSAP 542 matches any of severity 561, truthfulness 563, and content 564 to voice communication 277 based on corresponding locations 593, 594, or 596. The locations may be the same as location 592 or at least within a specified proximity of location 592. In one aspect, one or more of severity 561, truthfulness 563, and content 564 are received at PSAP 542 during voice communication 577. Severity 561, truthfulness 563, and content 564 may provide a call taker with information caller 588 has yet to provide and/or seems unwilling/unable to provide. As such, based on one or more of severity 561, truthfulness 563, and content 564, a call taker can adjust questioning of caller 588 to request more relevant information.

As described, severity 561, truthfulness 563, and content 564 can be included in event 566, along with location 597 and time 593. PSAP 542 can match event 566 to 911 call 121H based on locations 597 and 592.

In one aspect, PSAP 542 specifically requests information about 911 call events within its area of responsibility. In response, event detection infrastructure 103 sends severity, truth, content, etc. for any active 911 call events to PSAP 542. In these aspects, event detection infrastructure 103 can cache active 911 calls for some amount of time. In another aspect, event detection infrastructure 103 sends severity, truth, content, etc. for 911 call events to appropriate PSAPs (e.g., based on location) as 911 call events are detected.

Providing severity, truth, and content to a PSAP permits a call taker to validate or invalidate an event as well as provides the call taker situational awareness about a scene. Truthfulness, severity, and content can be used by call takers and dispatchers to align (or change) a response to a reported emergency.

Other call information, such as, for example, Phase I and Phase II call data can be presented at legacy application 543 (e.g., a call intake system, a CAD system, etc.).

Characteristics of event 566, including any of location 597, time 593, severity 561, truthfulness 563, and content 564 can be displayed at 911 call supplemental display 544. In one aspect, the functionality of 911 call supplemental display 544 and legacy application 543 are integrated into a common application.

Supplementing 911 Call with Location in an Audio Overlay

Figure 8A:
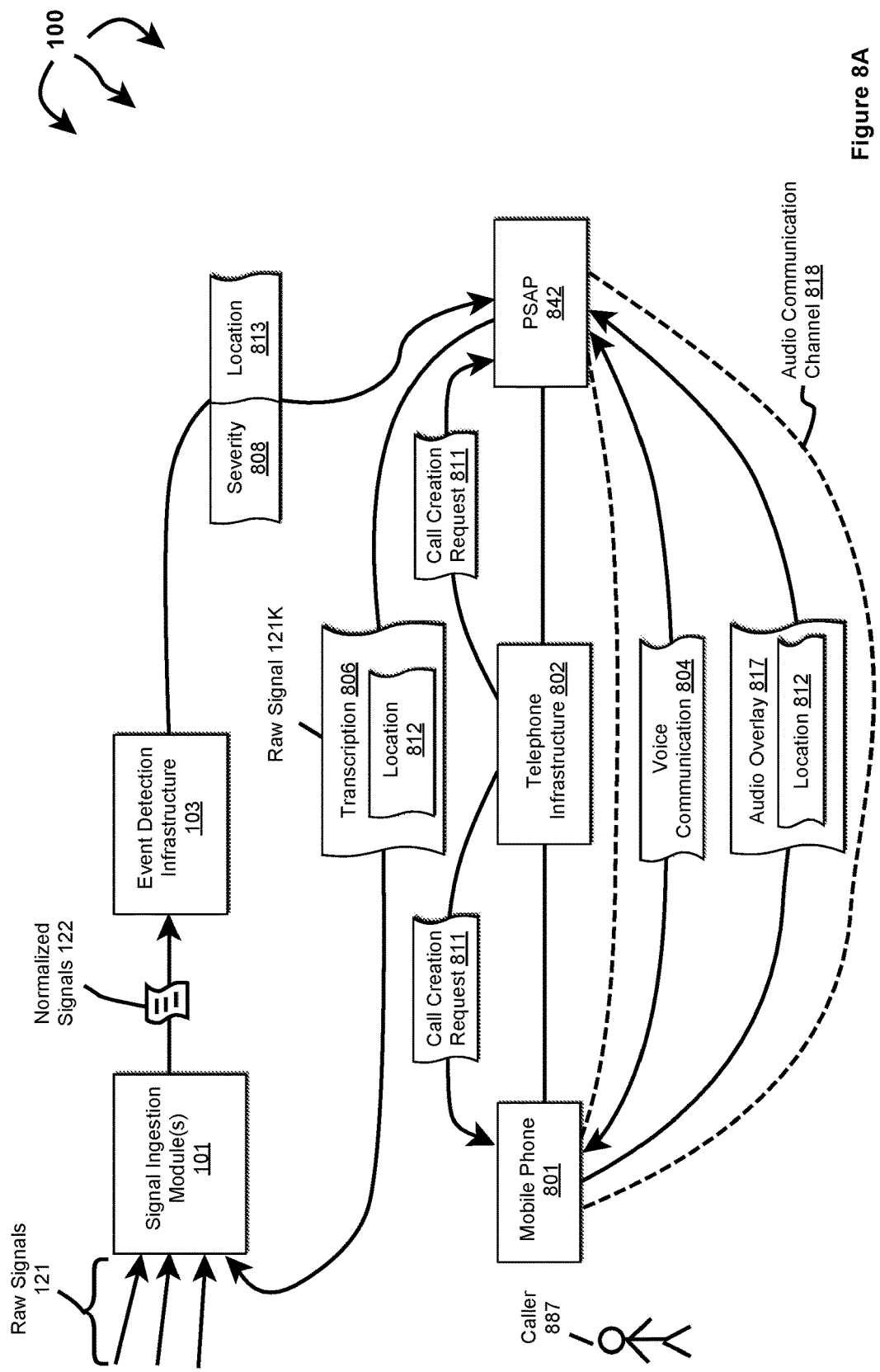
FIG. 8A illustrates an example computer architecture that facilitates sending a mobile phone generate location to a Public Safety Answering Point in an audio overlay.

FIG. 8A illustrates computer architecture 800 that facilitates sending a mobile phone generated location to a Public Safety Answering Point in an audio overlay. Turning to FIG. 8A, a mobile phone can supplement a 911 call with location in an audio overlay. Caller 887 can dial 911 on mobile phone 801 (e.g., a smart phone). On mobile phone 801, caller 887 can enter "911" and select a send function. Mobile phone 801 can send call creation request 811 to telephone infrastructure 802. Call creation request 811 can be a call creation request to establish a voice connection to an emergency call taker.

Call creation request 811 is received at telephone infrastructure 802. Telephone infrastructure 802 can include components from one or more of: a PSTN, a wireless carrier network, or a Voice over IP (VoIP) network. Telephone infrastructure 802 can determine that call creation request 811 is an emergency call and route call creation request 811 to PSAP 842.

Call creation request 811 can sent to a cell site and then forwarded to a mobile switching center (MSC). Mobile phone 801 may have previously registered with the MSC. As such, subscriber data for the mobile phone is included in a visitor locator record (VLR). The MSC allocates a send and receive frequency for audio communication channel 818. The MSC also creates a call detail record (CDR) for a call between mobile phone 801 and PSAP 842.

Figure 10:
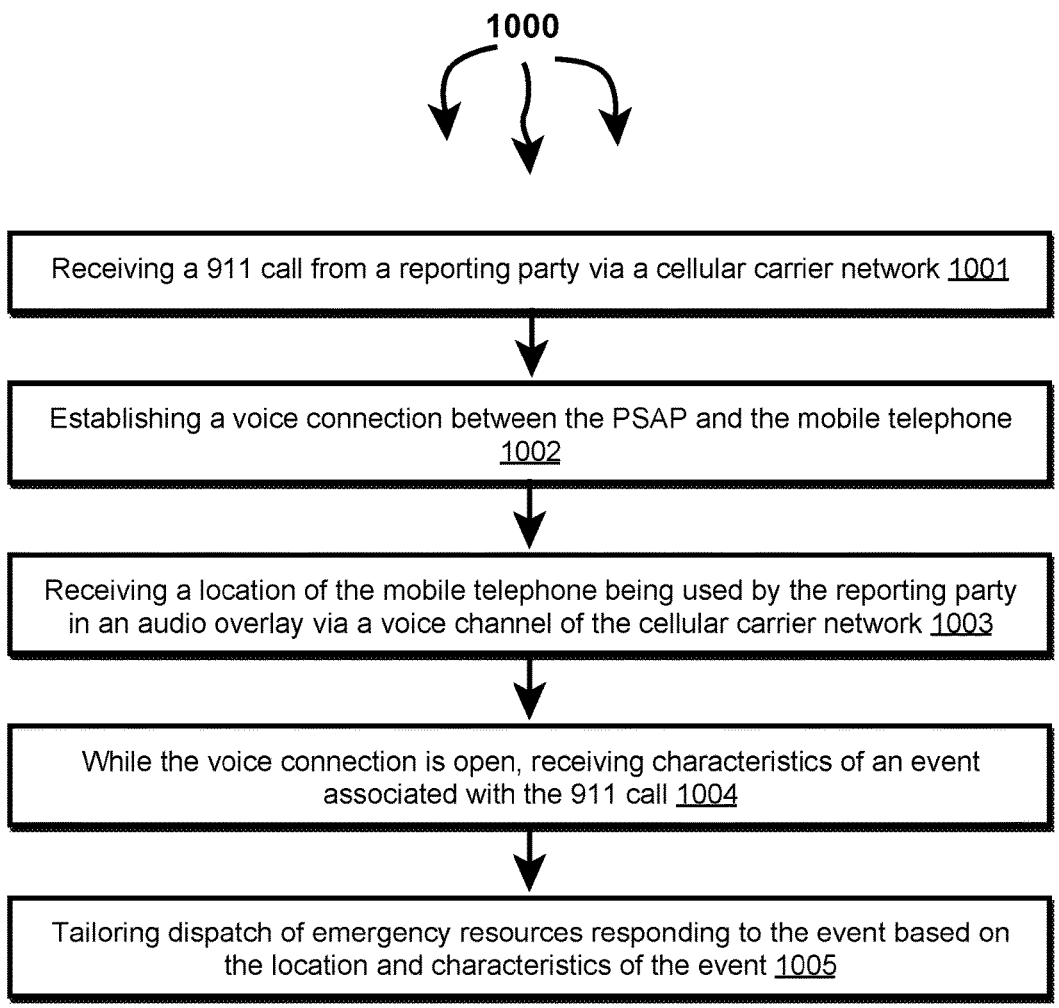
FIG. 10 illustrates a flow chart of an example method for receiving characteristics of an event derived from an audio overlay at a Public Safety Answering Point.

FIG. 10 illustrates a flow chart of an example method 1000 for receiving characteristics of an event derived from an audio overlay at a Public Safety Answering Point. Method 1000 will be described with respect to the components and data of computer architecture 100 (primarily in FIG. 8A).

Method 1000 includes receiving a 911 call from a reporting party via a cellular carrier network (1001). Method 1000 includes establishing a voice connection between the PSAP and the mobile telephone (1002). For example, the mobile switching center can route call creation request 811 to a PSTN. The mobile carrier network and PSTN establish audio communication (duplex) channel 818 between PSAP 842 and mobile phone 801. Mobile phone 801 can then use the send and receive frequencies to send audio communication and receive audio (e.g., voice and other sound) communication respectively over audio communication channel 818.

The MSC converts between wireless and wired audio communication. Wired audio voice communication can go through various transformations, translations, etc. between the MSC, through the PSTN, to PSAP 842 and vice versa. When audio communication channel 818 is established, mobile phone 801 and PSAP 842 can exchange voice communication 804.

Method 1000 includes receiving a location of the mobile telephone being used by the reporting party in an audio overlay via a voice channel of the cellular carrier network (1003). For example, mobile phone can send audio overlay 817, including location 812 (of mobile phone), over audio communication channel 818. PSAP 842 can receive audio overlay, including location 812, from mobile phone 801.

Mobile phone 801 can output audio overlay 817 at a lower, but discernible, volume relative to the volume of voice communication 804. Mobile phone 801 can dynamically adjust the volume of audio overlay 817 based on a detected volume of voice communication 804 so that the caller 887 and a call taker at PSAP 842 can communicate even if volume of voice communication 804 fluctuates. When voice communication 804 is not detected for a specified period of time, mobile phone 801 can output audio overlay 817 at a specified (and possibly somewhat increased) volume.

Mobile phone 801 can repeatedly insert audio overlay 817 into audio communication channel 818 at designated intervals (e.g., every 5-15 seconds). Thus, if calling party 887 is moving, calling party 817 can be tracked.

Method 1000 includes while the voice connection is open, receiving characteristics of an event associated with the 911 call (1004). For example, caller 887 can relay the nature of an emergency or other reason for calling 911 to a call taker at PSAP 842. The call taker can verbally request a location of the emergency or other situation from caller 887.

The call taker can validate a location given by caller 887 with location 812 or vice versa. As communication occurs, voice communication 804 and audio overlay 817 can be transcribed to text. PSAP 842 (or a third party service) can send raw signal 121K to signal ingestion module 101. As depicted, raw signal 121K includes transcription 806 containing location 812. Signal ingestion modules 101 can ingest raw signal 121K, normalize raw signal 121K, and include transcription 806 including location 812 in normalized signals 122.

Event detection infrastructure 103 can determine severity 808 of an event corresponding to a 911 call at or near location 812. Event detection infrastructure 103 can determine severity 808 solely from the content of raw signal 121K or from considering transcription 806, including location 212, in view of the content of other normalized signals. Event detection infrastructure 103 can indicate severity 808 and location 813 back to PSAP 842.

In one aspect, severity 808 and location 813 are received at PSAP 842 during voice communication 804 (e.g., before the 911 call ends). PSAP 842 can match severity 808 to voice communication 804 based on location 813. In one aspect, location 813 and location 812 are the same location. In another aspect, location 813 and location 812 differ but are with a specified proximity of one another. For example, locations 812 and 813 can be nearby or adjacent addresses on the same street, location 812 can be an intersection and location 813 can be the name of a business on a corner of the intersection, locations 812 and 813 can be nearby (e.g., adjacent) geo cells of a specified precision, etc.

Based on the proximity of location 812 to location 813, a call taker can infer that the 911 call relates to the event identified by event detection infrastructure 103. As such, severity 808 can guide the call taker when requesting further information from caller 887. Severity 808 can change (e.g., increasing or decreasing) as additional signals are ingested and consider by event detection infrastructure 103. The call taker can correspondingly change questioning to adapt to changing severity.

Severity 808 can continue to be updated at CAD after details of the 911 call are forwarded to CAD. Updated severity can be sent to CAD. Thus, dispatchers can adjust (tailor) dispatched resources to better align with an event as severity changes. For example, dispatcher can notify responding units to transition to an emergency response (e.g., activating lights and/or sirens) when severity increases.

Event detection infrastructure 103 can similarly determine a truthfulness (or lack thereof) of an event associated the 911 call (based on transcription 806 and possibly in consideration of other signals). Event detection infrastructure 103 can send a truthfulness to PSAP 842. A call taker can use the truthfulness to validate or invalidate the 911 call. Truthfulness can also change (e.g., increasing or decreasing) as additional signals are ingested. A call taker can correspondingly change questioning to adapt to changing truthfulness.

Truthfulness can continue to be updated at CAD after details of the 911 call are forwarded to CAD. Updated truthfulness can be sent to CAD. Thus, dispatchers can adjust dispatched resources to better align with an event as truthfulness changes. For example, a dispatcher can call off an emergency response (e.g., deactivate lights and/or sirens) (or call of a response all together) when an event is invalidated.

Event detection infrastructure 103 can also identify relevant content, such as, for example, text, images, video, audio, etc. related to a 911 call. Content can be included in other signals at or near location 812. Event detection infrastructure 103 can send content to PSAP 842. The content can provide a call taker with situational awareness of an event (as well as evidence of truthfulness and/or severity). A call taker can correspondingly change questioning based on provided situational awareness. As additional content is detected, the additional content can be sent to PSAP 242.

Content may continue to be detected after details of the 911 call are forwarded to CAD. Additional detected content can be sent to CAD. Thus, dispatchers can adjust dispatched resources to better align with an event as situational awareness changes.

Figure 8B:
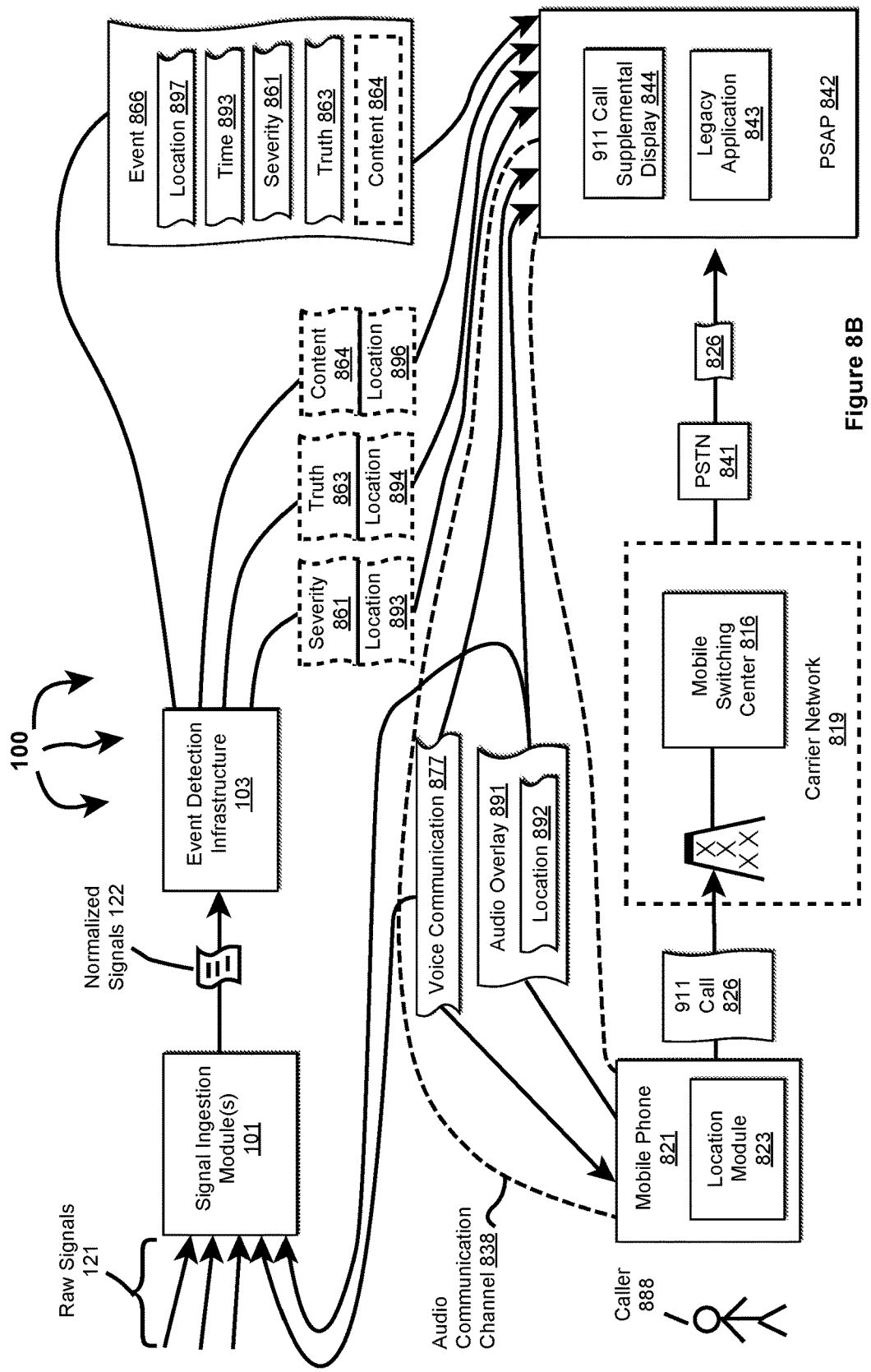
FIG. 8B illustrates an example computer architecture that facilitates sending event characteristics derived from an audio overlay to a Public Safety Answering Point.

FIG. 8B illustrates computer architecture 100 that facilitates sending event characteristics derived from an audio overlay to a Public Safety Answering Point. Turning to FIG. 8B, caller 288 can enter "911" at mobile phone 821 and select "send". In response, mobile phone 821 sends 911 call 826 to carrier network 819. 911 call 826 is received at cell site 815 and MSC 816 forwards 911 call 826 to PSTN 841. PSTN 841 sends 911 call 826 to PSAP 842. Audio communication channel 838 is established, and mobile phone 821 and PSAP 842 can exchange audio (e.g., voice) communication over audio communication channel 838.

For example, caller 888 and a call taker at PSAP 842 can exchange voice communication 877 over audio communication channel 838. Mobile phone 821 can also insert audio overlay 891, containing location 892 (of mobile phone 821), into audio communication channel 838. Audio overlay 891 can be transmitted to PSAP 842. PSAP 842 can use location 892 to allocate first responder resources. The call taker can validate a location given by caller 888 with location 892 or vice versa.

Voice communication 877 and/or audio overlay 891 can also be streamed to signal ingestion modules 101 as raw signals. Signal ingestion modules 101 can ingest voice communication 877 and/or audio overlay 891, normalize raw voice communication 877 and/or audio overlay 891, and include content of voice communication 877 and/or location 892 in normalized signals 122.

Figure 9:
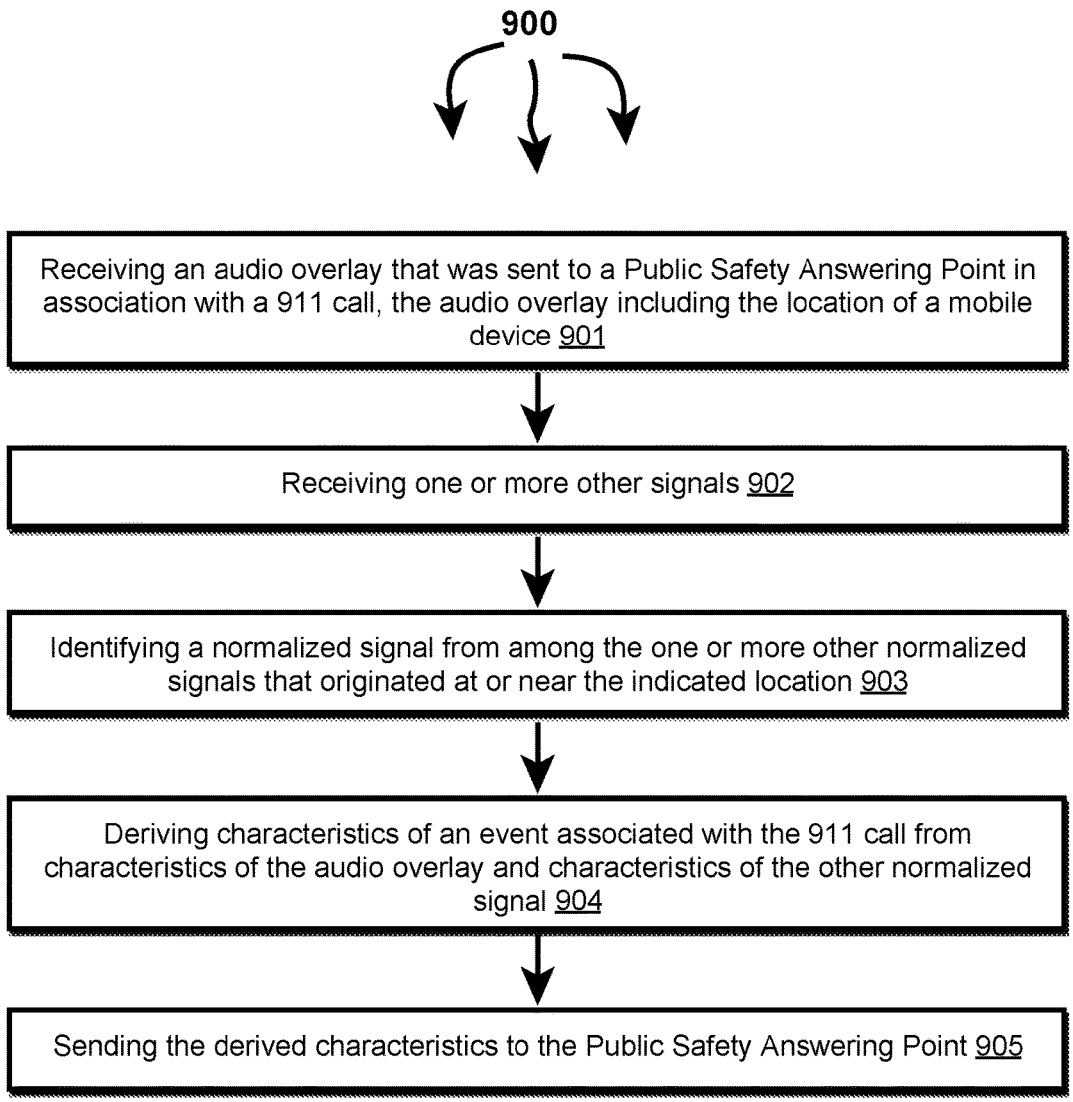
FIG. 9 illustrates a flow chart of an example method for deriving characteristics of an event from an audio overlay.

FIG. 9 illustrates a flow chart of an example method 900 for deriving characteristics of an event from an audio overlay. Method 9000 will be described with respect to the components and data of computer architecture 100 (primarily in FIG. 8B).

Method 900 includes receiving an audio overlay that was sent to a Public Safety Answering Point in associated with a 911 call, the audio overlay including the location of a mobile device (901). For example, event detection infrastructure can receive a normalized signal that was normalized from audio overlay 891. Method 900 includes receiving one or more other signals (902). For example, event detection infrastructure 103 can receive one or more other normalized signals from signal ingestion modules 101. Method 900 includes identifying a normalized signal from among the one or more other normalized signals that originated at or near the indicated location (903). For example, event detection infrastructure 103 can identify another normalized signal that originated at or near location 892.

Method 900 includes deriving characteristics of an event associated with the 911 call from characteristics of the audio overlay and characteristics of the other normalized signal (904). Method 900 includes sending the derived characteristics to the Public Safety Answering Point (905). For example, event detection infrastructure 103 can detect/determine/identify one or more of: severity 861, truthfulness 863, and content 864 for an event (e.g., the event reported by caller 288) associated with the 911 call from normalized signals 822 (including a normalized signal normalized from audio overlay 891). Event detection infrastructure 103 can detect/determine/identify severity 861, truthfulness 863, and content 864 at different times as additional signals are ingested. Event detection infrastructure 803 can send severity 861, truthfulness 863, and content 864 along with a location (e.g., 893, 894, or 896) to PSAP 842 as they are detected/determined. Thus, severity 861, truth 863, and content 864 can be sent to PSAP 842 at different times as a scene develops.

PSAP 842 can match any of severity 861, truthfulness 863, and content 864 to voice communication 877 based on corresponding locations 893, 894, or 896. The locations may be the same as location 892 or at least within a specified proximity of location 892. In one aspect, one or more of severity 861, truthfulness 863, and content 864 are received at PSAP 842 during voice communication 877. Severity 861, truthfulness 863, and content 864 may provide a call taker with information caller 888 has yet to provide and/or seems unwilling/unable to provide. As such, based on one or more of severity 861, truthfulness 863, and content 864, a call taker can adjust questioning of caller 888 to request more relevant information.

In one aspect, severity 861, truthfulness 863, and content 864 are included in event 8266, along with location 897 and time 893. PSAP 842 can match event 866 to the 911 call based on locations 897 and 892. Event detection infrastructure 103 can send event 866 to PSAP 842.

Severity 861, truthfulness 863, and content 864 as well as other information in event 866 can be presented at 911 call supplemental display 844.

In one aspect, PSAP 842 specifically requests information about 911 call events within its area of responsibility. In response, event detection infrastructure 103 sends severity, truth, content, etc. for any active 911 call events to PSAP 842. In these aspects, event detection infrastructure 103 can cache active 911 calls for some amount of time. In another aspect, event detection infrastructure 103 sends severity, truth, content, etc. for 911 call events to appropriate PSAPs (e.g., based on location) as 911 call events are detected.

Providing severity, truth, and content to a PSAP permits a call taker to valid or invalidate an event as well as provides the call taker situational awareness about a scene. Truthfulness, severity, and content can be used by call takers and dispatchers to align (or change) a response to a reported emergency.

Characteristics of event 866, including any of location 897, time 893, severity 861, truthfulness 863, and content 864 can be displayed at 911 call supplemental display 844. Other call information, such as, for example, Phase I and Phase II call data can be presented at legacy application 843 (e.g., a call intake system, a CAD system, etc.). In one aspect, the functionality of 911 call supplemental display 844 and legacy application 843 are integrated into a common application.

Smart Phone Architecture

Figure 11:
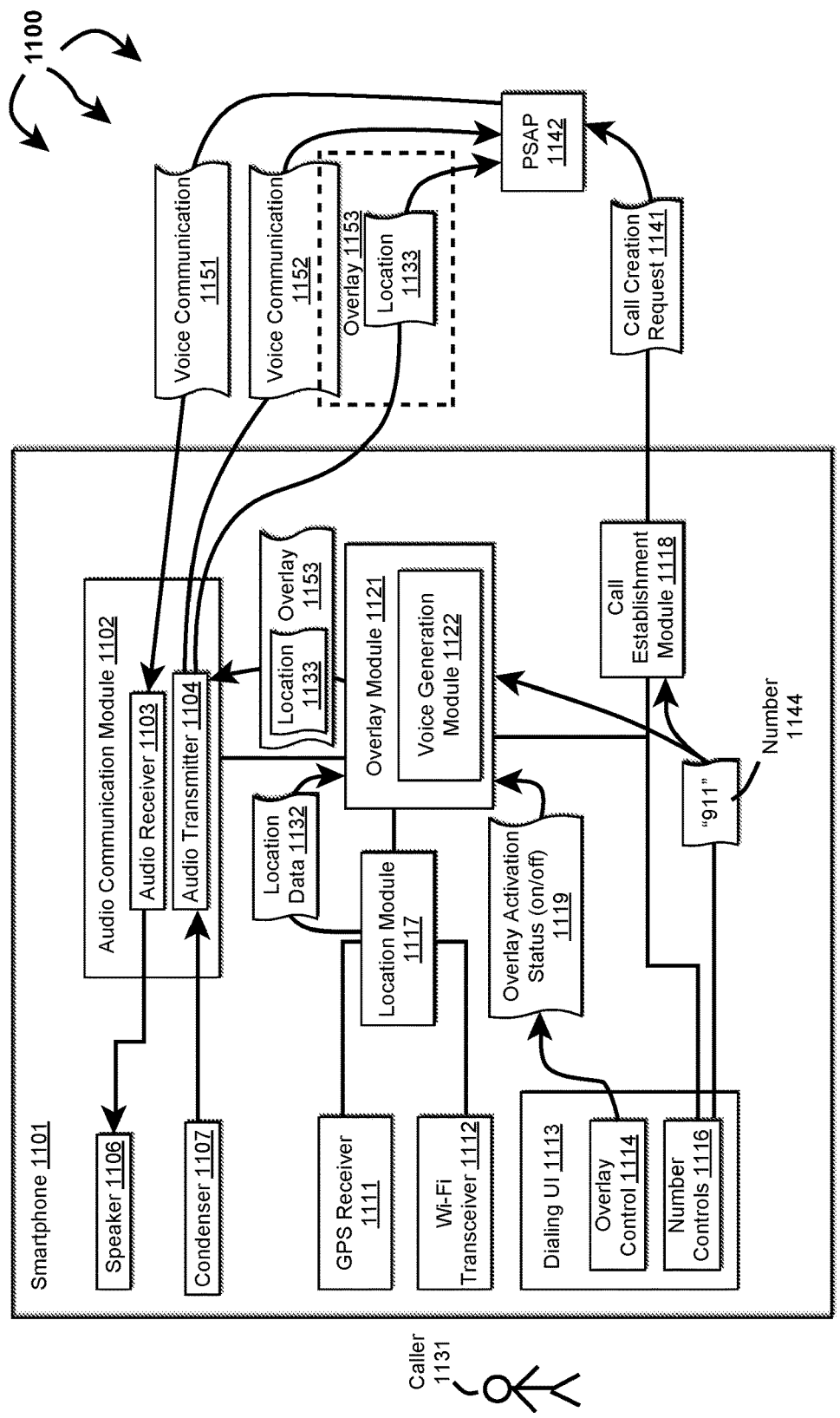
FIG. 11 illustrates an example mobile phone architecture that facilitates generating an audio overlay.

FIG. 11 depicts a smartphone architecture 1100. As depicted, architecture 1100 includes smartphone 1101 and PSAP 1142. Smartphone 1101 includes dialing user interface 1113, call establishment module 1118, GPS receiver 1111, Wi-Fi transceiver 1111, speaker 1106, condenser 1107, audio communication module 1102, location module 1117, and overlay module 1121. Dialing UI further includes number controls and overlay control. Caller 1131 can use overlay control 1114 to activate and deactivate the sending of audio overlays during a 911 call. Overlay activation status 1119 can store an indication of whether audio overlays are "on" or "off".

User 1131 can use number controls 1116 to enter the number '9' '1' '1' and select send. In response, number 1144 "911" is sent to call establishment module 1118 and overlay module 1121. Call establishment module 1118 can send call creation request 1141 that is routed through a carrier network and PSTN to PSAP 1142. PSAP 1142 can accept call creation request 1141. A duplex audio communication channel can be established between smartphone 1101 and PSAP 1142. Audio receiver 1103 can receive audio, including voice communication 1151, from PSAP 1142 on a receive frequency. Similarly, audio transmitter 1104 can transmit audio, including voice communication 1152, to PSAP 1142 on a send frequency.

In response to receiving number 1144 "911", overlay module 1121 can check overlay activation status 1119 to determine if overlays are turned "on". If overlays are "on", overlay module 1121 can attempt to obtain location data from location module 1117. Upon receiving a location request, location module 1117 can activate GPS receiver 1111 and Wi-Fi transceiver 1112 is appropriate. Location module 1117 can obtain location data 1132 (indicating the location of smartphone 1101) and send location data 1132 to overlay module 1121. Overlay generation module can transform location data 1132 into location 1133 (the location of smartphone 1101). Voice generation module 1122 can transform location 1133 into audio overlay 1153 (e.g., an audio clip), such as, for example, a synthesized voice. The synthesized voice can state that "the location of the calling device is . . . ". The location can be a street address, intersection, geo cell, business name, AOI, lat/lon, etc.

Overlay module 1121 can instruct audio transmitter 1104 to insert overlay 1153 into the transmit frequency to PSAP 1142. Overlay 1153 can overlay on voice communication 1152 or other audio on the transmit frequency. At PSAP 1142, the audio clip, such as, for example, the synthesized voice, can be output at a speaker. As such, location 1133 is provided to a call taker at PSAP 1142. Overlay 1153 can be repeatedly sent to PSAP 1142 at specified intervals.

As smartphone 1101 moves, new location data 1132 can be acquired from GPS receiver 1111 and/or Wi-Fi transceiver 1112. Overlay module 1121 can transform the new location data 1132 to a new location 1133. New location 1133 can be included in a new overlay and sent to PSAP 1142. Thus, PSAP 1142 can track the movements of smartphone 1101.

Overlay module 1121 can also monitor the volume of voice communication 1151 and 1152. Overlay module 1121 can adjust the volume of an audio overlay so that an audio clip (synthetic voice) is at a lower, but discernible, volume relative to the volume of voice communication 1151 and 1152. Overlay module 1121 can dynamically change the volume of overlays to adjust for changing volumes of voice communication 151 and 152. When no voice communication is detected for a specified amount of time, overlays can be output at a designated (potentially increased) volume.

Accordingly, aspects of the invention facilitate acquisition of live, ongoing forms of data into an event detection system. Signals from multiple sources of data can be combined and normalized for a common purpose (of event detection). Data ingestion, event detection, and event notification process data through multiple stages of logic with concurrency.

A unified interface can handle incoming signals and content of any kind. The interface can handle live extraction of signals across dimensions of time, location, and context. In some aspects, heuristic processes are used to determine one or more dimensions. Acquired signals can include text and images as well as live-feed binaries, including live media in audio, speech, fast still frames, video streams, etc.

Signal normalization enables the world's live signals to be collected at scale and analyzed for detection and validation of live events happening globally. A data ingestion and event detection pipeline aggregates signals and combines detections of various strengths into truthful events. Thus, normalization increases event detection efficiency facilitating event detection closer to "live time" or at "moment zero".

In one aspect, the entity analyzes data (signals) from different data providers (signal sources) to attempt to identify occurring live events (e.g., fire, police response, mass shooting, traffic accident, natural disaster, storm, active shooter, concerts, protests, etc.).

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A computer-implemented method comprising:
   receiving a normalized emergency call signal derived from an original emergency call that was routed from a carrier network to a Public Safety Answering Point (PSAP);
   identifying a probable origination location of the original emergency call from features of the normalized emergency call signal;
   accessing one or more additional normalized signals within a specified distance of the probable origination location;
   validating the probable origination location, from features of the one or more additional signals, to establish a validated origination location;
   detecting an event from the features of normalized emergency call signal based on the validated origination location, the event including the validated origination location and a probability that the event is true; and
   sending the event to the PSAP notifying the PSAP of additional data related to the original emergency call.

2. The method of claim 1, further comprising:
   determining a severity based on characteristics of the normalized emergency call signal and the one or more additional normalized signals; and
   including the severity in the event.

3. The method of claim 1, wherein receiving the normalized emergency call signal comprises receiving a transcript of voice communication within the original emergency call between a mobile telephone caller and a PSAP call taker.

4. The method of claim 1, further comprising listening for additional normalized signals in geo cells within the specified distance of the probable location prior to accessing the one or more additional normalized signals.

5. The method of claim 1, wherein receiving a normalized emergency call signal comprises receiving a normalized emergency call signal in a Time, Location, Context (TLC) format; and
   wherein accessing one or more additional normalized signals comprises accessing one or more additional normalized signals in the TLC format.

6. The method of claim 1, wherein receiving the normalized emergency call signal comprises receiving the normalized signal normalized from an audio overlay indicating the probable call location.

7. The method of claim 1, wherein receiving the normalized emergency call signal comprises receiving the normalized emergency call signal that was previously stripped of personal information related to the original emergency call.

8. The method of claim 1, wherein detecting the event comprises detecting an event category as one or more of: a fire, a shooting, an active shooter, a traffic accident, a natural disaster, or a protest.

9. The method of claim 1, wherein detecting the event further comprises detecting a event features from the one or more additional normalized signals.

10. The method of claim 1, wherein sending the event to the PSAP further comprises sending the event to the PSAP prior to the carrier network sending phase II data to the PSAP.

11. A system comprising:
   a processor;
   system memory coupled to the processor and storing instructions configured to cause the processor to:

receive a normalized emergency call signal derived from an original emergency call that was routed from a carrier network to a Public Safety Answering Point (PSAP);

identify a probable location from features of the normalized emergency call signal;

access one or more additional normalized signals within a specified distance of the probable location;

validate the probable location from features of the one or more additional signals to establish a validated location;

detect an event from the features of normalized emergency call signal based on the validated location, the event including the validated location and a probability that the event is true; and send the event to the PSAP notifying the PSAP of additional data related to the original emergency call.

12. The system of claim 11, further comprising instructions configured to:

determine a severity based on characteristics of the normalized emergency call signal and the one or more additional normalized signals; and include the severity in the event.

13. The system of claim 11, wherein instructions configured to receive a normalized emergency call signal comprise instructions configured to receive a transcript of voice communication between a mobile telephone caller and a PSAP call taker.

14. The system of claim 11, further comprising instructions configured to listen for additional normalized signals in geo cells within the specified distance of the location prior to accessing the one or more additional normalized signals.

15. The system of claim 11, wherein the instructions configured to receive a normalized emergency call signal comprise instructions configured to receive a normalized emergency call signal in a Time, Location, Context (TLC) format; and wherein instructions configured to access one or more additional normalized signals comprise instructions configured to access one or more additional normalized signals in the TLC format.

16. The system of claim 11, wherein the instructions configured to receive a normalized emergency call signal comprise instructions configured to receive a normalized signal normalized from an audio overlay indicating the call location.

17. The system of claim 11, wherein the instructions configured to receive a normalized emergency call signal comprise instructions configured to receive a normalized emergency call signal previously stripped of personal information related to the emergency call.

18. The system of claim 11, wherein the instructions configured to detect an event comprise instructions configured to detect an event categorized as one or more of: a fire, a shooting, an active shooter, a traffic accident, a natural disaster, or a protest.

19. The system of claim 11, wherein the instructions configured to detect an event comprise instructions configured to detect an event from features of the one or more additional normalized signals.

20. The system of claim 11, wherein the instructions configured to send the event to the comprise instructions configured to send the event to the prior to the carrier network sending phase II data to the PSAP.

* * * * *